(12) United States Patent
Mishra et al.

(10) Patent No.: US 10,573,313 B2
(45) Date of Patent: *Feb. 25, 2020

(54) AUDIO ANALYSIS LEARNING WITH VIDEO DATA

(71) Applicant: Affectiva, Inc., Boston, MA (US)

(72) Inventors: Taniya Mishra, New York, NY (US); Rana el Kaliouby, Milton, MA (US)

(73) Assignee: Affectiva, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,054

(22) Filed: Feb. 11, 2019

(65) Prior Publication Data

US 2019/0172462 A1     Jun. 6, 2019

Related U.S. Application Data

(63) Continuation of application No. 15/861,855, filed on Jan. 4, 2018, now Pat. No. 10,204,625, which is a
(Continued)

(51) Int. Cl.
    *G10L 15/22*     (2006.01)
    *G10L 15/02*     (2006.01)
    (Continued)

(52) U.S. Cl.
    CPC .......... *G10L 15/22* (2013.01); *B60R 16/0373* (2013.01); *B60W 50/10* (2013.01);
    (Continued)

(58) Field of Classification Search
    CPC . B60R 16/0373; G10L 15/02; G10L 15/1807; G10L 15/22; G10L 15/25;
    (Continued)

(56) References Cited

U.S. PATENT DOCUMENTS 3,034,500 A  5/1962 Backster, Jr.
3,548,806 A  12/1970 Fisher
(Continued)

FOREIGN PATENT DOCUMENTS

JP        08115367      7/1996
KR   10-2005-0021759 A  3/2005
(Continued)

OTHER PUBLICATIONS

Rana Ayman El Kaliouby, Mind-reading machines: automated inference of complex mental states, Jul. 2005, University of Cambridge, Cambridge, United Kingdom.
(Continued)

*Primary Examiner* — Omeed Alizada
(74) *Attorney, Agent, or Firm* — Adams Intellex, PLC

(57) ABSTRACT

Audio analysis learning is performed using video data. Video data is obtained, on a first computing device, wherein the video data includes images of one or more people. Audio data is obtained, on a second computing device, which corresponds to the video data. A face within the video data is identified. A first voice, from the audio data, is associated with the face within the video data. The face within the video data is analyzed for cognitive content. Audio features corresponding to the cognitive content of the video data are extracted. The audio data is segmented to correspond to an analyzed cognitive state. An audio classifier is learned, on a third computing device, based on the analyzing of the face within the video data. Further audio data is analyzed using the audio classifier.

27 Claims, 16 Drawing Sheets

Related U.S. Application Data continuation of application No. 15/670,791, filed on Aug. 7, 2017, now Pat. No. 10,074,024, which is a continuation-in-part of application No. 15/666,048, filed on Aug. 1, 2017, which is a continuation-in-part of application No. 15/395,750, filed on Dec. 30, 2016, which is a continuation-in-part of application No. 15/262,197, filed on Sep. 12, 2016, now abandoned, which is a continuation-in-part of application No. 14/796,419, filed on Jul. 10, 2015, now abandoned, which is a continuation-in-part of application No. 14/460,915, filed on Aug. 15, 2014, which is a continuation-in-part of application No. 13/153,745, filed on Jun. 6, 2011, now abandoned, said application No. 15/670,791 is a continuation-in-part of application No. 14/214,918, filed on Mar. 15, 2014, now Pat. No. 9,723,992, which is a continuation-in-part of application No. 13/153,745, filed on Jun. 6, 2011, now abandoned.

(60) Provisional application No. 62/611,780, filed on Dec. 29, 2017, provisional application No. 62/593,440, filed on Dec. 1, 2017, provisional application No. 62/593,449, filed on Dec. 1, 2017, provisional application No. 62/557,460, filed on Sep. 12, 2017, provisional application No. 62/541,847, filed on Aug. 7, 2017, provisional application No. 62/524,606, filed on Jun. 25, 2017, provisional application No. 62/503,485, filed on May 9, 2017, provisional application No. 62/469,591, filed on Mar. 10, 2017, provisional application No. 62/448,448, filed on Jan. 20, 2017, provisional application No. 62/442,325, filed on Jan. 4, 2017, provisional application No. 62/442,291, filed on Jan. 4, 2017, provisional application No. 62/370,421, filed on Aug. 3, 2016, provisional application No. 62/301,558, filed on Feb. 29, 2016, provisional application No. 62/273,896, filed on Dec. 31, 2015, provisional application No. 62/265,937, filed on Dec. 10, 2015, provisional application No. 62/222,518, filed on Sep. 23, 2015, provisional application No. 62/217,872, filed on Sep. 12, 2015, provisional application No. 62/128,974, filed on Mar. 5, 2015, provisional application No. 62/082,579, filed on Nov. 20, 2014, provisional application No. 62/047,508, filed on Sep. 8, 2014, provisional application No. 62/023,800, filed on Jul. 11, 2014, provisional application No. 61/972,314, filed on Mar. 30, 2014, provisional application No. 61/953,878, filed on Mar. 16, 2014, provisional application No. 61/867,007, filed on Aug. 16, 2013, provisional application No. 61/467,209, filed on Mar. 24, 2011, provisional application No. 61/447,464, filed on Feb. 28, 2011, provisional application No. 61/447,089, filed on Feb. 27, 2011, provisional application No. 61/439,913, filed on Feb. 6, 2011, provisional application No. 61/414,451, filed on Nov. 17, 2010, provisional application No. 61/388,002, filed on Sep. 30, 2010, provisional application No. 61/352,166, filed on Jun. 7, 2010, provisional application No. 62/439,928, filed on Dec. 29, 2016, provisional application No. 61/927,481, filed on Jan. 15, 2014, provisional application No. 61/924,252, filed on Jan. 7, 2014, provisional application No. 61/916,190, filed on Dec. 14, 2013, provisional application No. 61/844,478, filed on Jul. 10, 2013, provisional application No. 61/789,038, filed on Mar. 15, 2013, provisional application No. 61/790,461, filed on Mar. 15, 2013, provisional application No. 61/793,761, filed on Mar. 15, 2013, provisional application No. 61/798,731, filed on Mar. 15, 2013.

(51) Int. Cl.

| | | |
|---|---|---|
| *G10L 25/63* | (2013.01) | |
| *G10L 25/90* | (2013.01) | |
| *G10L 15/18* | (2013.01) | |
| *G10L 21/055* | (2013.01) | |
| *G06K 9/00* | (2006.01) | |
| *B60R 16/037* | (2006.01) | |
| *B60W 50/10* | (2012.01) | |
| *G10L 15/25* | (2013.01) | |
| *G10L 25/51* | (2013.01) | |
| *G10L 21/0356* | (2013.01) | |

(52) U.S. Cl.
CPC ..... *G06K 9/00288* (2013.01); *G06K 9/00315* (2013.01); *G10L 15/02* (2013.01); *G10L 15/1807* (2013.01); *G10L 15/25* (2013.01); *G10L 21/055* (2013.01); *G10L 25/51* (2013.01); *G10L 25/63* (2013.01); *G10L 25/90* (2013.01); *B60W 2540/02* (2013.01); *B60W 2540/04* (2013.01); *G10L 21/0356* (2013.01); *G10L 2015/223* (2013.01)

(58) Field of Classification Search
CPC ........... G10L 2015/223; G10L 21/0356; G10L 21/055; G10L 25/63; G10L 25/90
See application file for complete search history.

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |

(56) References Cited

U.S. PATENT DOCUMENTS

| | | |
|---|---|---|
| 6,004,061 A | 12/1999 | Manico et al. |
| 6,004,312 A | 12/1999 | Finneran et al. |
| 6,008,817 A | 12/1999 | Gilmore, Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,308,133 B1* | 10/2001 | Loffert .................. G01C 21/26 340/995.19 |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,003,135 B2 | 2/2006 | Hsieh et al. |
| 7,013,478 B1 | 3/2006 | Hendricks et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 9,798,974 B2 | 10/2017 | Ball et al. |
| 9,813,366 B2 | 11/2017 | Guthery et al. |
| 9,819,622 B2 | 11/2017 | Guthery et al. |
| 9,843,404 B2 | 12/2017 | Kiely et al. |
| 9,911,435 B1 | 3/2018 | Sugar et al. |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1* | 5/2003 | Dimitrova .............. H04N 7/163 725/10 |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2004/0267521 A1* | 12/2004 | Cutler .................... G10L 15/25 704/202 |
| 2005/0187437 A1 | 8/2005 | Matsugu |
| 2005/0283055 A1 | 12/2005 | Shirai et al. |
| 2005/0289582 A1 | 12/2005 | Tavares et al. |
| 2006/0019224 A1 | 1/2006 | Behar et al. |
| 2006/0143647 A1 | 6/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0184170 A1 | 7/2008 | Periyalwar |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0299840 A1 | 12/2009 | Smith |
| 2010/0070523 A1 | 3/2010 | Delgo et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0231240 A1 | 9/2011 | Schoen et al. |
| 2011/0251493 A1 | 10/2011 | Poh et al. |
| 2011/0263946 A1 | 10/2011 | el Kaliouby et al. |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2014/0172910 A1 | 6/2014 | Jung et al. |

(56) References Cited

U.S. PATENT DOCUMENTS

| | | | |
|---|---|---|---|
| 2014/0220526 A1* | 8/2014 | Sylves | G06Q 30/0201 |
| | | | 434/238 |
| 2016/0104486 A1 | 4/2016 | Penilla et al. | |
| 2017/0003784 A1 | 1/2017 | Garg et al. | |
| 2017/0352361 A1 | 12/2017 | Thorn | |
| 2017/0371615 A1 | 12/2017 | Gummadi et al. | |
| 2018/0032610 A1 | 2/2018 | Cameron et al. | |
| 2018/0032611 A1 | 2/2018 | Cameron et al. | |
| 2018/0076913 A1 | 3/2018 | Kiely et al. | |

FOREIGN PATENT DOCUMENTS

| | | | |
|---|---|---|---|
| KR | 10-2008-0016303 A | 2/2008 | |
| KR | 1020100048688 A | 5/2010 | |
| WO | WO 2011/045422 A1 | 4/2011 | |

OTHER PUBLICATIONS

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Xuming He, et al, Learning and Incorporating Top-Down Cues in Image Segmentation, 2006, Lecture Notes in Computer Science, ISBN 978-3-540-33832-1, Springer-Verlag, Germany.

Ross Eaton, et al, Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

Albiol, Alberto, et al. "Face recognition using HOG-EBGM." Pattern Recognition Letters 29.10 (2008): 1537-1543.

* cited by examiner

AUDIO ANALYSIS LEARNING WITH VIDEO DATA

RELATED APPLICATIONS

This application is a continuation of U.S. patent application "Audio Analysis Learning using Video Data" Ser. No. 15/861,855, filed Jan. 4, 2018, which claims the benefit of U.S. provisional patent applications "Audio Analysis Learning using Video Data" Ser. No. 62/442,325, filed Jan. 4, 2017, "Smart Toy Interaction using Image Analysis" Ser. No. 62/442,291, filed Jan. 4, 2017, "Vehicle Manipulation using Occupant Image Analysis" Ser. No. 62/448,448, filed Jan. 20, 2017, "Image Analysis for Two-sided Data Hub" Ser. No. 62/469,591, filed Mar. 10, 2017, "Vehicle Artificial Intelligence Evaluation of Mental States" Ser. No. 62/503,485, filed May 9, 2017, "Image Analysis for Emotional Metric Generation" Ser. No. 62/524,606, filed Jun. 25, 2017, "Image Analysis and Representation for Emotional Metric Threshold Evaluation" Ser. No. 62/541,847, filed Aug. 7, 2017, "Multimodal Machine Learning for Emotion Metrics" Ser. No. 62/557,460, filed Sep. 12, 2017, "Speech Analysis for Cross-Language Mental State Identification" Ser. No. 62/593,449, filed Dec. 1, 2017, "Avatar Image Animation using Translation Vectors" Ser. No. 62/593,440, filed Dec. 1, 2017, and "Directed Control Transfer for Autonomous Vehicles" Ser. No. 62/611,780, filed Dec. 29, 2017.

The patent application "Audio Analysis Learning using Video Data" Ser. No. 15/861,855, filed Jan. 4, 2018, is also a continuation-in-part of U.S. patent application "Mental State Analysis Using Blink Rate for Vehicles" Ser. No. 15/670,791, filed Aug. 7, 2017, which claims the benefit of U.S. provisional patent applications "Image Analysis Framework using Remote Learning with Deployable Artifact" Ser. No. 62/439,928, filed Dec. 29, 2016, "Audio Analysis Learning using Video Data" Ser. No. 62/442,325, filed Jan. 4, 2017, "Vehicle Manipulation using Occupant Image Analysis" Ser. No. 62/448,448, filed Jan. 20, 2017, "Smart Toy Interaction using Image Analysis" Ser. No. 62/442,291, filed Jan. 4, 2017, "Image Analysis for Two-sided Data Hub" Ser. No. 62/469,591, filed Mar. 10, 2017, "Vehicle Artificial Intelligence Evaluation of Mental States" Ser. No. 62/503,485, filed May 9, 2017, and "Image Analysis for Emotional Metric Generation" Ser. No. 62/524,606, filed Jun. 25, 2017.

The patent application "Mental State Analysis Using Blink Rate for Vehicles" Ser. No. 15/670,791, filed Aug. 7, 2017 is also continuation-in-part of U.S. patent application "Mental State Analysis Using Blink Rate" Ser. No. 14/214,918, filed Mar. 15, 2014, which claims the benefit of U.S. provisional patent applications "Mental State Analysis Using Blink Rate" Ser. No. 61/789,038, filed Mar. 15, 2013, "Mental State Analysis Using Heart Rate Collection Based on Video Imagery" Ser. No. 61/793,761, filed Mar. 15, 2013, "Mental State Data Tagging for Data Collected from Multiple Sources" Ser. No. 61/790,461, filed Mar. 15, 2013, "Mental State Well Being Monitoring" Ser. No. 61/798,731, filed Mar. 15, 2013, "Personal Emotional Profile Generation" Ser. No. 61/844,478, filed Jul. 10, 2013, "Heart Rate Variability Evaluation for Mental State Analysis" Ser. No. 61/916,190, filed Dec. 14, 2013, "Mental State Analysis Using an Application Programming Interface" Ser. No. 61/924,252, filed Jan. 7, 2014, and "Mental State Analysis for Norm Generation" Ser. No. 61/927,481, filed Jan. 15, 2014.

The patent application "Mental State Analysis Using Blink Rate" Ser. No. 14/214,918, filed Mar. 15, 2014, is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Data Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The patent application "Mental State Analysis Using Blink Rate for Vehicles" Ser. No. 15/670,791, filed Aug. 7, 2017 is also a continuation-in-part of U.S. patent application "Computer Based Convolutional Processing for Image Analysis" Ser. No. 15/666,048, filed Aug. 1, 2017, which claims the benefit of U.S. provisional patent applications "Deep Convolutional Neural Network Analysis of Images for Mental States" Ser. No. 62/370,421, filed Aug. 3, 2016, "Image Analysis Framework using Remote Learning with Deployable Artifact" Ser. No. 62/439,928, filed Dec. 29, 2016, "Audio Analysis Learning using Video Data" Ser. No. 62/442,325, filed Jan. 4, 2017, "Vehicle Manipulation using Occupant Image Analysis" Ser. No. 62/448,448, filed Jan. 20, 2017, "Smart Toy Interaction using Image Analysis" Ser. No. 62/442,291, filed Jan. 4, 2017, "Image Analysis for Two-sided Data Hub" Ser. No. 62/469,591, filed Mar. 10, 2017, "Vehicle Artificial Intelligence Evaluation of Mental States" Ser. No. 62/503,485, filed May 9, 2017, and "Image Analysis for Emotional Metric Generation" Ser. No. 62/524,606, filed Jun. 25, 2017.

The patent application "Computer Based Convolutional Processing for Image Analysis" Ser. No. 15/666,048, filed Aug. 1, 2017 is also a continuation-in-part of U.S. patent application "Image Analysis using Sub-sectional Component Evaluation to Augment Classifier Usage" Ser. No. 15/395,750, filed Dec. 30, 2016, which claims the benefit of U.S. provisional patent applications "Image Analysis Using Sub-Sectional Component Evaluation to Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The patent application "Image Analysis using Sub-sectional Component Evaluation to Augment Classifier Usage" Ser. No. 15/395,750, filed Dec. 30, 2016, is also a continuation-in-part of U.S. patent application "Mental State Event Signature Usage" Ser. No. 15/262,197, filed Sep. 12, 2016, which claims the benefit of U.S. provisional patent applications "Mental State Event Signature Usage" Ser. No. 62/217,872, filed Sep. 12, 2015, "Image Analysis In Support of Robotic Manipulation" Ser. No. 62/222,518, filed Sep. 23, 2015, "Analysis of Image Content with Associated Manipulation of Expression Presentation" Ser. No. 62/265,937, filed Dec. 10, 2015, "Image Analysis Using Sub-Sectional Component Evaluation To Augment Classifier Usage" Ser. No. 62/273,896, filed Dec. 31, 2015, "Analytics for Live Streaming Based on Image Analysis within a Shared Digital Environment" Ser. No. 62/301,558, filed Feb. 29, 2016, and "Deep Convolutional Neural Network Analysis of Images for Mental States" Ser. No. 62/370,421, filed Aug. 3, 2016.

The patent application "Mental State Event Signature Usage" Ser. No. 15/262,197, filed Sep. 12, 2016, is also a continuation-in-part of U.S. patent application "Mental State Event Definition Generation" Ser. No. 14/796,419, filed Jul. 10, 2015, which claims the benefit of U.S. provisional patent applications "Mental State Event Definition Generation" Ser. No. 62/023,800, filed Jul. 11, 2014, "Facial Tracking with Classifiers" Ser. No. 62/047,508, filed Sep. 8, 2014, "Semiconductor Based Mental State Analysis" Ser. No. 62/082,579, filed Nov. 20, 2014, and "Viewership Analysis Based On Facial Evaluation" Ser. No. 62/128,974, filed Mar. 5, 2015.

The patent application "Mental State Event Definition Generation" Ser. No. 14/796,419, filed Jul. 10, 2015 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352,166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

The patent application "Mental State Event Definition Generation" Ser. No. 14/796,419, filed Jul. 10, 2015 is also a continuation-in-part of U.S. patent application "Mental State Analysis Using an Application Programming Interface" Ser. No. 14/460,915, Aug. 15, 2014, which claims the benefit of U.S. provisional patent applications "Application Programming Interface for Mental State Analysis" Ser. No. 61/867,007, filed Aug. 16, 2013, "Mental State Analysis Using an Application Programming Interface" Ser. No. 61/924,252, filed Jan. 7, 2014, "Heart Rate Variability Evaluation for Mental State Analysis" Ser. No. 61/916,190, filed Dec. 14, 2013, "Mental State Analysis for Norm Generation" Ser. No. 61/927,481, filed Jan. 15, 2014, "Expression Analysis in Response to Mental State Express Request" Ser. No. 61/953,878, filed Mar. 16, 2014, "Background Analysis of Mental State Expressions" Ser. No. 61/972,314, filed Mar. 30, 2014, and "Mental State Event Definition Generation" Ser. No. 62/023,800, filed Jul. 11, 2014.

The patent application "Mental State Analysis Using an Application Programming Interface" Ser. No. 14/460,915, Aug. 15, 2014 is also a continuation-in-part of U.S. patent application "Mental State Analysis Using Web Services" Ser. No. 13/153,745, filed Jun. 6, 2011, which claims the benefit of U.S. provisional patent applications "Mental State Analysis Through Web Based Indexing" Ser. No. 61/352, 166, filed Jun. 7, 2010, "Measuring Affective Data for Web-Enabled Applications" Ser. No. 61/388,002, filed Sep. 30, 2010, "Sharing Affect Across a Social Network" Ser. No. 61/414,451, filed Nov. 17, 2010, "Using Affect Within a Gaming Context" Ser. No. 61/439,913, filed Feb. 6, 2011, "Recommendation and Visualization of Affect Responses to Videos" Ser. No. 61/447,089, filed Feb. 27, 2011, "Video Ranking Based on Affect" Ser. No. 61/447,464, filed Feb. 28, 2011, and "Baseline Face Analysis" Ser. No. 61/467,209, filed Mar. 24, 2011.

Each of the foregoing applications is hereby incorporated by reference in its entirety.

FIELD OF ART

This application relates generally to audio analysis and more particularly to audio analysis learning using video data.

BACKGROUND

Anthroposemiotics is a field of study which seeks to understand how humans communicate. Humans typically communicate to share information, to influence one another, or to persuade one another, among many other reasons and purposes. Human communication includes sounds such as speech and non-speech vocalizations. Human communication also includes nonverbal communication and visual communication. As a result, human voices and human facial expressions, eye contact, or touch, play a key role at all levels of human communication. The human face is capable of assuming a wide and varied range of facial expressions. Facial expressions can be formed consciously and unconsciously and can convey fundamental information such as cognitive content, emotions, thoughts, reactions, and other information. The facial expressions are formed by physical movements or positions of facial muscles. The movements and positions of facial muscles form expressions that convey numerous cognitive states ranging from happy to sad, including expressions of anger, fear, disgust, surprise, and many others.

Non-verbal communication takes place between and among people, without exchanging words. Non-verbal communication supplements verbal communication and can be categorized as visual cues, distance cues, voice cues, and touch cues. Visual cues often include body language and facial expressions. An angry face conveys an opposite message to a smiling face. Physical distance cues are also informative. Towering over another person threatens, while sitting with the person reassures. Voice cues, called paralanguage, include rate, pitch, volume, voice quality, or prosody. Loud and rapid speech can indicate anger or alarm, while soft and slow speech can indicate ease or comfort. Touch or haptic cues can also be used for non-verbal communication. A handshake can communicate welcome or confidence, and a welcomed touch can convey affection. In stark contrast to a welcomed touch, an unwelcomed touch can cause anger and disgust.

Data can be collected from a person for a variety of purposes. The data often includes video data and audio data. The video data can be analyzed to determine a facial expression, to perform facial recognition, to conduct identity confirmation, or to determine a range of cognitive states, including mental states or emotional states, that relate to the person. Similarly, the voice data can be analyzed for voice recognition, biometric confirmation, or cognitive states. The cognitive states can include frustration, ennui, confusion, cognitive overload, skepticism, delight, satisfaction, calmness, stress, and many others. As a result, human facial expressions and human voices play critical roles at all levels of human communication.

SUMMARY

Video data analysis has been used for identifying objects within an image, facial identification, mental state analysis, emotional state analysis, and so on. Yet, video analysis alone does not always differentiate more complex content such as cognitive content. Cognitive content, which is based on cognition, includes mental action or processing. The mental action or processing can include attention, comprehension, decision making, evaluation, judgment, knowledge, memory, problem solving, or working memory. Cognition also includes knowledge of a language. While video data analysis can determine facial expressions, the video analysis alone encounters difficulty when the face being analyzed is occluded. The occlusion of the face can result from glasses, and eye patch, hair, facial hair, a facial covering, a partial view of a face, etc. Occlusion can also result from actions of a person. For example, a person's hand can cover the mouth during a yawn, the eyes during a scary scene in a movie, or the ears during a fireworks display.

Video data analysis and audio signal analysis can be used to accomplish improved facial analysis for cognitive content. Audio signal analysis can serve a variety of purposes such as differentiation between music and speech, voice identification, distinguishing audio events such as thunderstorms or car horns, and so on. The audio signal analysis is based audio classifiers which can be learned based on analyzing a face within the video data. By capturing audio data as well as the video data, the audio data can be synchronized with the video data. The synchronization or association of the audio data and the video data augments the analysis of the cognitive content. A video of the face of a person while yawning, while occluded by a hand of the person covering their mouth, can be augmented by non-speech sounds such as inhalation, sighs, and so on.

Audio analysis learning is based on using video data analysis to learn audio classifiers. Video data that includes images of one or more people is obtained. The facial image data and other image data can be captured using one or more cameras or another image capture apparatus. Audio data corresponding to the video data is also obtained. The audio data can be captured using one or more microphones, audio transducers, or another audio capture apparatus. A face within the video data is identified. The identification of the face within the video data can be based on using image classifiers. A first voice, from the audio data, is associated with the face within the video data. The associating the first voice with the face can be based on a time stamp, an event, etc. The face within the video data is analyzed for cognitive content. An audio classifier is learned based on the analyzing of the face within the video data. The audio classifier that is learned can be used for analysis of the audio data and further audio data. Audio features which correspond to the cognitive content of the video are extracted. The audio features can include timbre, prosody, vocal register, vocal resonance, pitch, speech loudness, or speech rate. The analyzing the first voice for features includes language analysis. The cognitive content includes detection of one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

In some embodiments, a computer-implemented method for audio analysis comprises: obtaining video data, on a first computing device, wherein the video data includes images of one or more people; obtaining audio data, on a second computing device, corresponding to the video data; identifying a face within the video data; associating a first voice, from the audio data with the face within the video data; analyzing the face within the video data for cognitive content; learning an audio classifier on a third computing device based on the analyzing of the face within the video data; and analyzing further audio data using the audio classifier.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
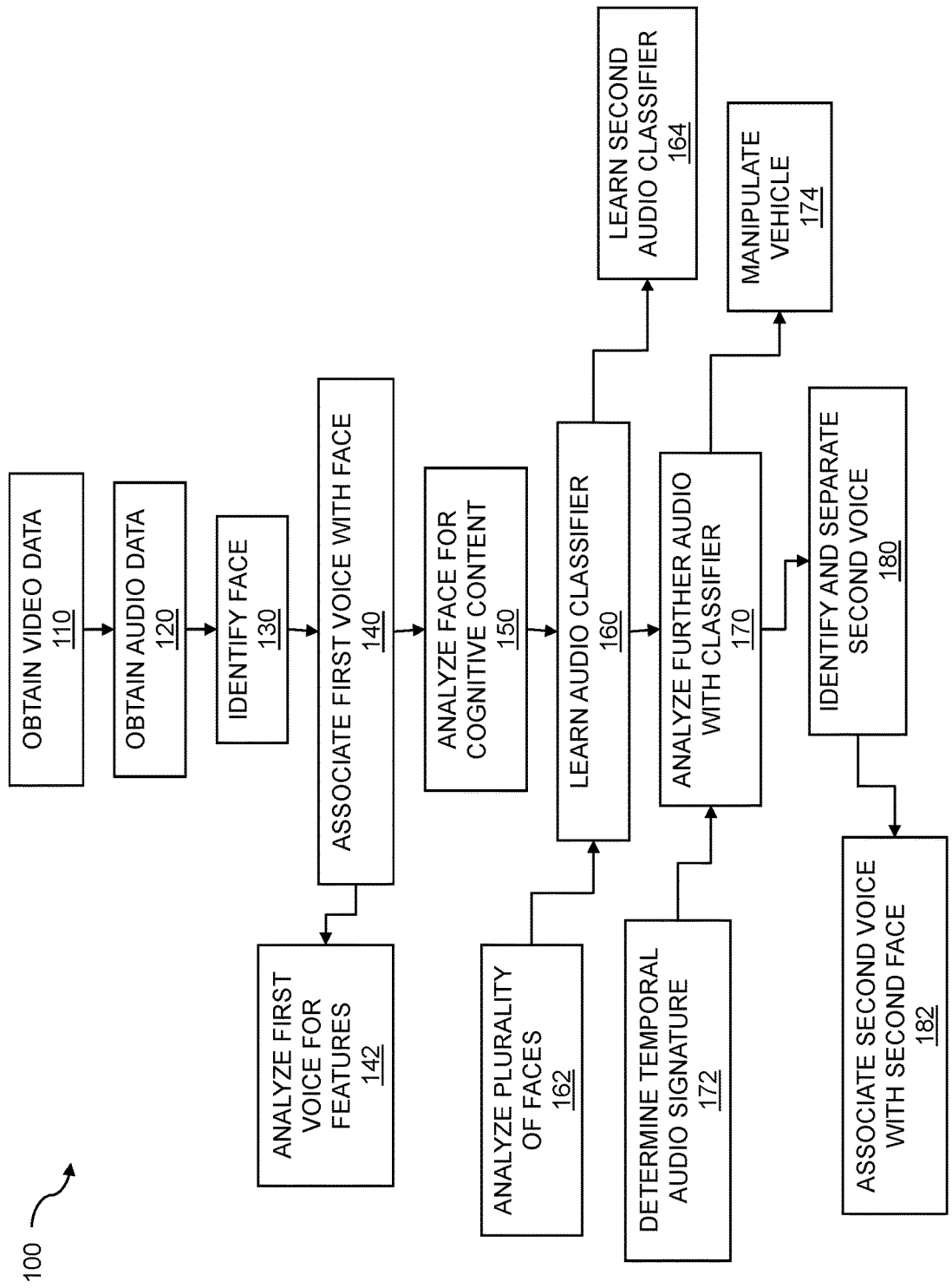
FIG. 1 is a flow diagram for audio analysis in the context of video.

Humans continuously process visual stimuli emanating from the environment in which they find themselves. They experience their surroundings using their senses, including sight, to process their environment for a variety of purposes, such as locating objects to pick up or avoid, scanning for potential dangers, and differentiating loved ones and friends from strangers, among many other tasks. Much of the processing is instinctual. For example, a sudden movement caught in a person's peripheral vision can cause a shift of attention to the source of the movement. The shift causes the person to look for the source of the movement. The shift of attention can be due to fear, interest, and so on. If the movement is a glint of sunlight caught by a wave on a lake, the source is probably harmless and can be appreciated or ignored. On the other hand, if the source of movement is of an imminent danger, then immediate, evasive action is required.

Humans observe each other's faces and listen to each other's voices when they interact, although the degree of observation can vary from culture to culture. Whether or not the interactions include smell, touch, or any of the other senses, sight and sound play critical roles in social interaction. Sight is critical to human interaction because the human face is highly expressive. The various facial expressions range widely and can convey a cognitive state of a person, an emotional state of a person, and so on. For example, a seductive smile communicates a very different message than an angry frown. A neutral facial expression can indicate boredom, inattention, indifference, and so on. This exchange of "social information" between or among the participants in the interaction greatly influences how the interaction progresses. A smile might attract people to the interaction and retain them in it, while an angry frown, a sneer, or another negative expression can cause people to leave the interaction, perhaps hastily. In this sense, facial expressions can control the interactions. Sound is also critical to human interaction. The combination of sight and sound adds additional information to interpersonal communications. While a smiling face and a cheery voice can indicate happiness, a menacing voice, even if accompanied with a smile, can convey a different, darker message.

Multi-modal emotion sensing, where the modes can include video, audio, and so on, can be based on annotated audio-video data. The annotated audio-video data, of which there is little, can be found in datasets with manually annotated emotion labels. The datasets can include RECOLA™, IEMOCAP™, FAU™, AVEC2011™, and so on. In order to build multi-modal datasets that can generalize across language, gender, culture, other demographics, and other aspects of human life that contribute to emotional presentation, significantly larger emotion-annotated datasets are required. Semi-supervised and unsupervised techniques, some of which can be based on deep learning, can be used to annotate data with emotion labels.

Facial expressions can provide supervision for learning emotion tags on a parallel speech channel to a video channel. The natural synchrony between face and speech for expressing emotions can be leveraged to enhance the extraction of emotional content from speech. The alignment between a face and speech can be found by using a technique such as an autonomous training technique. The autonomous training technique can transfer discriminative facial expressions from robust face-based facial expression models into a speech modality. Emotion tag classifiers can be learned by ignoring the output layer of a deep network and by using the internal representation as features for training classifiers.

In the disclosed techniques, video data including images of one or more people are obtained. The image data can include video, frames from a video, still images, or another medium suitable for image capture. The video data can include a plurality of images that can include a plurality of people. Audio data corresponding to the video data is obtained. The audio data can be obtained using a microphone, an audio transducer, or another audio capture technique. A face within the video data is identified. The identifying can be accomplished using one or more classifiers. The identifying can be performed using a remote server, a cloud-based server, a personal electronic device, and so on. A first voice, from the audio data, can be associated with the face within the video data. The first voice can be synchronized with video data. The face within the video data can be analyzed for emotional content. The emotional content can include detection of one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, fatigue, drowsiness, or mirth. An audio classifier can be learned based on the analyzing of the face within the video data. The audio classifier can be used for analysis of further audio for emotional content within that audio.

FIG. 1 is a flow diagram for audio analysis in the context of video. The audio analysis 100 is based on learning using video data. An audio classifier is learned based on the analyzing of a face within obtained video data. Further audio data is analyzed using the audio classifier. The flow 100 includes obtaining video data 110 on a first computing device, wherein the video data includes images of one or more people. The image data can be obtained by using a camera, where the camera can be coupled to an electronic device with which the one or more people are interacting. More than one camera can be used for the obtaining of a series of images. The camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The flow 100 includes obtaining audio data 120 on a second computing device which corresponds to the video data. In embodiments, the first computing device and the second computing device are a common device. The audio data can be obtained using a microphone, an audio transducer, or another audio capture apparatus that can allow captured audio data to be used in an electronic system. In embodiments, a microphone is coupled to a camera with which the video data is obtained.

The flow 100 includes identifying a face 130 within the video data. The identifying the face can include using classifiers. The classifiers can be calculated, determined based on video and/or audio data, uploaded by a user, downloaded from the Internet, and so on. The identification of the face can include information on one or more of facial expressions, action units, head gestures, smiles, brow furrows, squints, lowered eyebrows, raised eyebrows, or attention. The action units (AU) can be based on the facial action coding system (FACS). The identifying the face can include the detection of facial expressions based on locating facial landmarks. Facial landmarks can include corners of eyebrows, corners of eyes, centers of eyes, tip of a nose, tips of ears, corners of a mouth, a chin, and so on. Any number of facial landmarks can be used for identifying the face. The identifying the face can include the detection of facial expressions based on locating facial regions. The facial regions can include eyebrows, eyes, ears, a nose, a mouth, and so on. Any number of facial regions can be included in identifying the face. The identifying 130 can include identifying a plurality of faces within the video data. The faces can include two or more people, a person and an animal, and so on. In embodiments, the identifying includes identifying a person and an object other than a person or an animal.

The flow 100 includes associating a first voice, from the audio data, with the face 140 within the video data. The first voice can be associated with the face based on characteristics of the face. The characteristics can include movement of the mouth associated with the face, the mouth being open, etc.; the eyes associated with the face being open or closed; and so on. In embodiments, the first voice can be associated with the face based on facial recognition, voice recognition, and the like. The flow 100 includes analyzing a first voice for features 142. The analyzing the first voice for features can include evaluation of timbre. Timbre can include a tone color, a tone quality, or other psychoacoustic or perceived sound quality. The analyzing of the first voice for features can include evaluation of prosody. Prosody can include properties of spoken syllables and larger speech units. Prosody can include elements of speech such as tone, intonation, stress, rhythm, cadence, etc. The analyzing the first voice for features can include analysis of vocal register and vocal resonance. Vocal register can refer to a range of tones that can be produced by a particular human voice, by several human voices, and so on. Vocal registers can include modal voice, falsetto, vocal fry, and so on. Vocal resonance can include an enhancement in timbre and intensity of a voice. The analyzing the first voice for features can include analysis of pitch. Pitch of a voice can include a range of frequencies that can be produced by the voice. The analyzing the first voice for features can include speech volume. Speech volume can be determined based on sound pressure level, acoustic pressure level, and so on. The analyzing the first voice for features can include speech rate. Speech rate can be determined by cadence, rhythm, tempo, etc. The analyzing the first voice for features can include language analysis. The language analysis can include language content. The language content can include keywords, key phrases, and the like.

The flow 100 includes analyzing the face within the video data for cognitive content 150. The analyzing for cognitive content can be based on one or more classifiers. The analyzing for cognitive content can include applying algorithms, heuristics, code segments, apps, programs, and so on. The cognitive content can include emotional content or mental state content. The cognitive content can include moods. The analyzing the face for cognitive content can be augmented by analyzing the video data with the audio data. The audio data can include non-speech vocalizations. In embodiments, non-speech vocalizations can include grunts, yelps, squeals, snoring, sighs, laughter, filled pauses, unfilled pauses, yawns, or the like. For a yawn, the mouth of a face in a video is likely occluded by a hand, complicating analysis of the face. By augmenting the analysis of the face with analysis of the sound of a yawn, a facial expression can be determined.

The flow 100 includes learning an audio classifier 160, on a third computing device, based on the analyzing of the face within the video data. The computing device can include a handheld electronic device, a wearable device, a laptop computer, a server, and so on. In embodiments, the second computing device and the third computing device are a common device. The audio classifier can be used for analyzing audio data for cognitive content. The learning the audio classifier is based on analyzing a plurality of faces 162 within the video data. The learning can be based on language analysis. The learning can be dependent on language content. The language content can include keywords, key phrases, syntactic and semantic parses, as well as other triggers that can be used to direct the learning. In embodiments, the learning is independent of language content. The learning can be based on the presence or absence of sounds. The learning can be accomplished using deep learning with unlabeled data. The unlabeled data can be uploaded by a user, downloaded from the Internet, publicly available, and so on. Deep learning can include algorithms for modeling high level abstractions of data. Deep learning can comprise various types of deep neural networks including components of artificial neural nets (ANNs), convolutional neural nets (CNNs), recurrent neural nets (RNNs), various combinations of these, and so on. The learning can be accomplished using supervised learning with labeled data. The labeled data can include test data, known good data, and so on. The supervised learning can be used for various purposes including training a support vector machine (SVM) as well as other types of machine learning techniques. Once trained, results of these machine learning techniques can be used to classify audio data, video data, and so on. In embodiments, the learning further encompasses a plurality of audio classifiers. The plurality of audio classifiers can be used to determine emotional content of audio data, video data, etc. In the flow 100, the learning further encompasses learning a second audio classifier 164. The second audio classifier can be applied to a second audio feature, to cognitive content, etc.

The learning of classifiers, whether video classifiers or audio classifiers, can be based on learning for specific cognitive content. The cognitive content can include mental states, emotional states, and so on. The learning of the video classifiers can be based on analysis of a face detected within video data. The learning of the audio classifiers can be based on analysis of a voice detected within audio data. The learning can include machine learning, where the machine learning can be based on a deep convolutional neural network, a convolutional neural network with a bottleneck layer, etc. The learning can include detection of cognitive content. The learning can include classifiers for other human actions such as yawning, sighing, groaning, laughing, singing, snoring, and the like.

The learning of classifiers, whether video classifiers or audio classifiers, is at times confounded by the presence of noise. For the learning of video classifiers, the video noise can include poorly lit scenes such as a dim vehicle interior or room, a partial or obstructed view from a camera to the face of a person, vibration blurring, out of focus blurring, low image resolution, etc. The learning of video classifiers is further complicated when the face within the video data is occluded. The face in the video data can be occluded by hair, facial hair, eyeglasses, an eye patch, a facial covering such as a veil, a shadow, and so on. The learning of audio classifiers is similarly complicated by audio noise. The audio noise can include background noise such as traffic noise, crowd noise, ambient noise, a low signal to noise ratio, and so on. The result of this image or audio noise is a diminished success rate in correctly classifying the image or sound.

To improve learning of classifiers, whether video classifiers, audio classifiers, or both types of classifiers, the learning can be accomplished by a teacher-student technique. In a teacher-student technique, the learning of one type of classifier, whether a video classifier or an audio classifier, can be based on the other type of classifier. That is, while one type of classifier can be successful in classifying an event, characteristic, feature, etc., of interest, the other type may not. The learning of the latter can be improved based on the success of the former. In one usage scenario, a video classifier can be learned to detect a yawn, where the learning is based on analysis of video data. The analysis for yawn detection is complicated because a view to the person's mouth is occluded. In many cultures, a yawning person covers their mouth with a hand. Thus, detection of a yawn based on a gaping mouth cannot be completed. By noting that a yawn is often accompanied by sudden and rapid inhalation, and perhaps other non-speech sounds, an audio classifier that detects the audio event can be used to help the learning of the video classifier. By detecting a yawn in the audio data, and by synchronizing the audio data with the video data, learning of the video classifier for audio detection can be improved. In this scenario, the learning the video classifier is the student, and the audio classifier is the teacher. This technique of learning a classifier of one type based on a classifier of another type can be applied to other situations. In a second usage scenario, an audio classifier can be trained to detect a yawn from a person traveling in an automobile. An audio classifier has been trained to detect a yawn of a person working in an office, but the classifier has difficulty detecting a yawn of the person in the automobile because of road noise, ambient automobile noise, poor microphone placement, etc. By using a video classifier learned to detect a yawn of a person in the car, and synchronizing the audio data and the video data, the learning of the audio classifier can be improved. In this usage scenario, the video classifier is the teacher, and the audio classifier is the student.

The flow 100 includes analyzing further audio data using the audio classifier 170. The audio can include voice data, ambient sounds, non-language verbalizations, and so on. The non-language vocalizations can include coughs, laughter, sighs, groans, etc. The analyzing further audio data can be part of machine learning. The flow 100 includes determining a temporal audio signature 172 for use with the further audio data. A temporal audio signature can be based on an audio event including human-made sounds such as laughter, whistling, groans, etc., and non-human sounds such as ambient noise, bangs, ringing bells, honking horns, background music, and the like. The flow 100 includes manipulating a vehicle 174 based on the analyzing of the further audio. The vehicle can be an autonomous vehicle, a self-guided vehicle, a semiautonomous vehicle, and so on. In embodiments, the manipulating the vehicle includes transferring into autonomous mode; transferring out of autonomous mode; locking out operation; recommending a break for the occupant; recommending a different route, recommending how far to drive; responding to traffic; adjusting seats, mirrors, climate control, lighting, music, audio stimuli, or interior temperature; activating brakes, and assuming steering control.

The flow 100 includes identifying and separating a second voice 180 from the obtained audio data corresponding to the video data but not associated with the face associated with a first voice, wherein the second voice is included in the learning. The second voice can be a voice from the audio data that was obtained from the one or more people. The second voice can include speech, singing, vocalizations, etc. The separating the second voice can include determining a second sound track, a second audio channel, and so on. The second voice could be from a second person viewing a video presentation; a passenger in a car, bus, plane, or train; a person in a room with the person associated with the first face; and so on. In embodiments, the flow 100 further includes associating the second voice with a second face 182 within the video data. Other voices can be identified and separated from the obtained audio, and can be associated with other faces within the video data. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
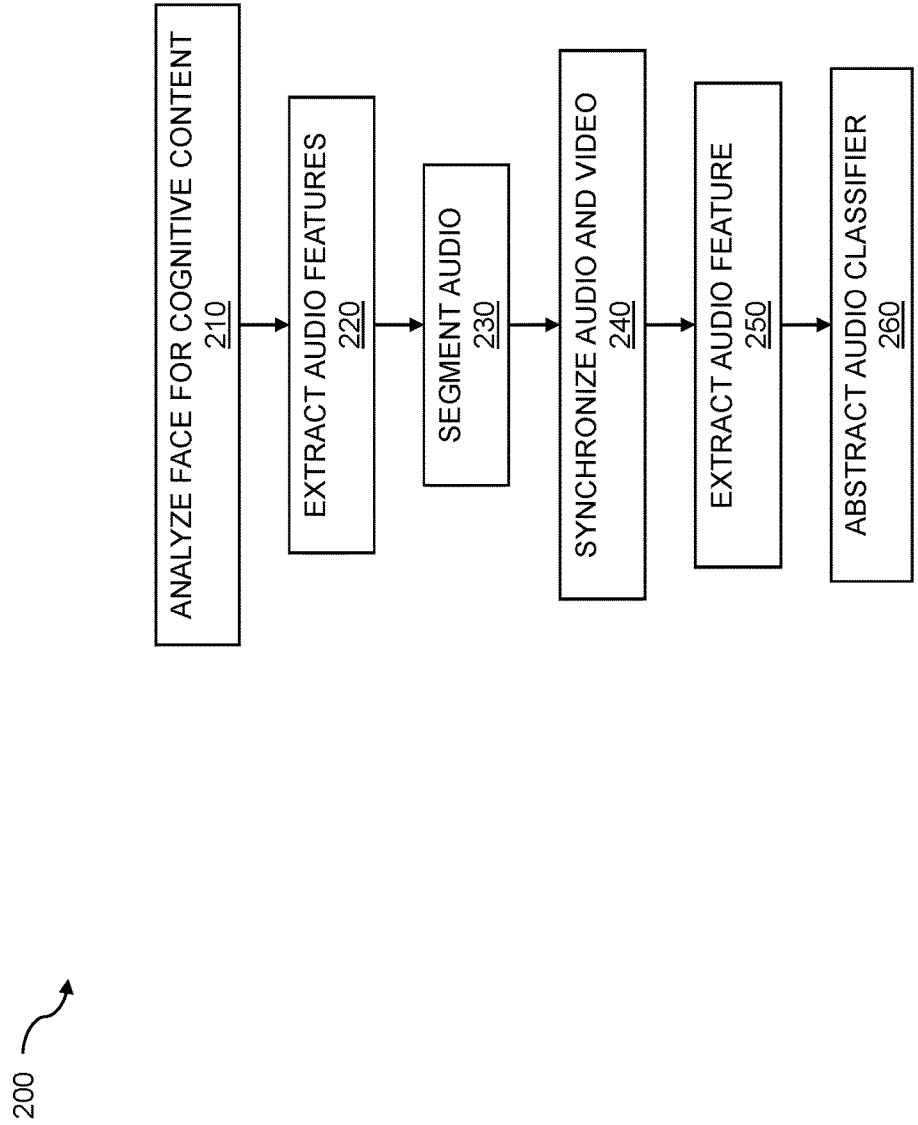
FIG. 2 is a flow diagram for audio cognitive content analysis.

FIG. 2 is a flow diagram for audio cognitive content analysis. The audio cognitive content analysis can be used for audio analysis learning using video data. Video data is obtained, where the video data includes images of one or more people. Audio data which corresponds to the video data is obtained. A face within the video data is identified, and a first voice from the audio data is associated with the face. The face is analyzed for cognitive content. An audio classifier is learned based on the analyzing, and the audio classifier is used for further analyzing the audio data. The flow 200 includes analyzing a face within the video data for cognitive content 210. The analyzing can be based on classifiers. The analyzing can include other content such as emotional content, mental state content, and so on. The flow 200 includes extracting audio features 220. The one or more audio features can be associated with analyzed face cognitive content. The audio features 220 can be extracted from a voice, where the voice can be associated with a face within video data. The audio features can be extracted based on analysis. The analyzing the first voice for features can include evaluation of timbre. Timbre can include tonal color, tonal quality, etc. The analyzing the first voice for features can include evaluation of prosody. Prosody can include rhythm and sound, stress and intonation, and the like. The analyzing the first voice for features can include analysis of vocal register and resonance, pitch, speech loudness, or speech rate. Other analysis tasks can be performed. In embodiments, the analyzing the first voice for features can include language analysis. The analyzing the first voice can be based on language content. The analyzing can be based on Romance languages, Asian languages, indigenous languages, and so on.

The flow 200 includes segmenting the audio data 230 to correspond to an analyzed cognitive state. The audio can be segmented based on the occurrence of an event, a timestamp, an elapsed period of time, and so on. In embodiments, the segmenting the audio data can be for a human sensorially detectable unit of time. A human sensorially detectable unit of time can be based on an absolute threshold that can be detected 50 percent of the time or more. The segmenting the audio data can include noticeable differences in intensity, duration, or pitch of a sound, a tone, a voice, and the like. In embodiments, the segmenting the audio data can be for less than thirty seconds. The flow 200 includes synchronizing audio data with video data 240. The audio can include a voice, a tone, a sound, etc. The synchronizing can include synchrony between a face and the voice in expressing cognitive states, mental states, emotional states, moods, and so on. The synchronizing can be based on markers in the audio data and the video data. The markers can occur due to an event such as a person speaking, a car horn, a sneeze, laughter, and so on. The synchronizing can be based on finding an alignment between the voice and the face with autonomous training techniques.

The flow 200 includes extracting an audio feature 250 associated with the analyzed face cognitive content. The audio feature can be one or more of evaluation of timbre and prosody. Other audio features can be extracted. In embodiments, the audio feature can include analyzing the first voice for features including analysis of vocal register and resonance, pitch, speech volume, or speech rate. The audio feature can include language analysis, where language analysis can be dependent on language content. Further embodiments include extracting audio features corresponding to the cognitive content of the video data. The flow 200 includes abstracting an audio classifier 260 based on the extracted audio feature. A classifier can be abstracted to differentiate speech from other sounds, to discern one voice from a second voice, and so on. The abstracted classifier can correspond to the cognitive content of the video data. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
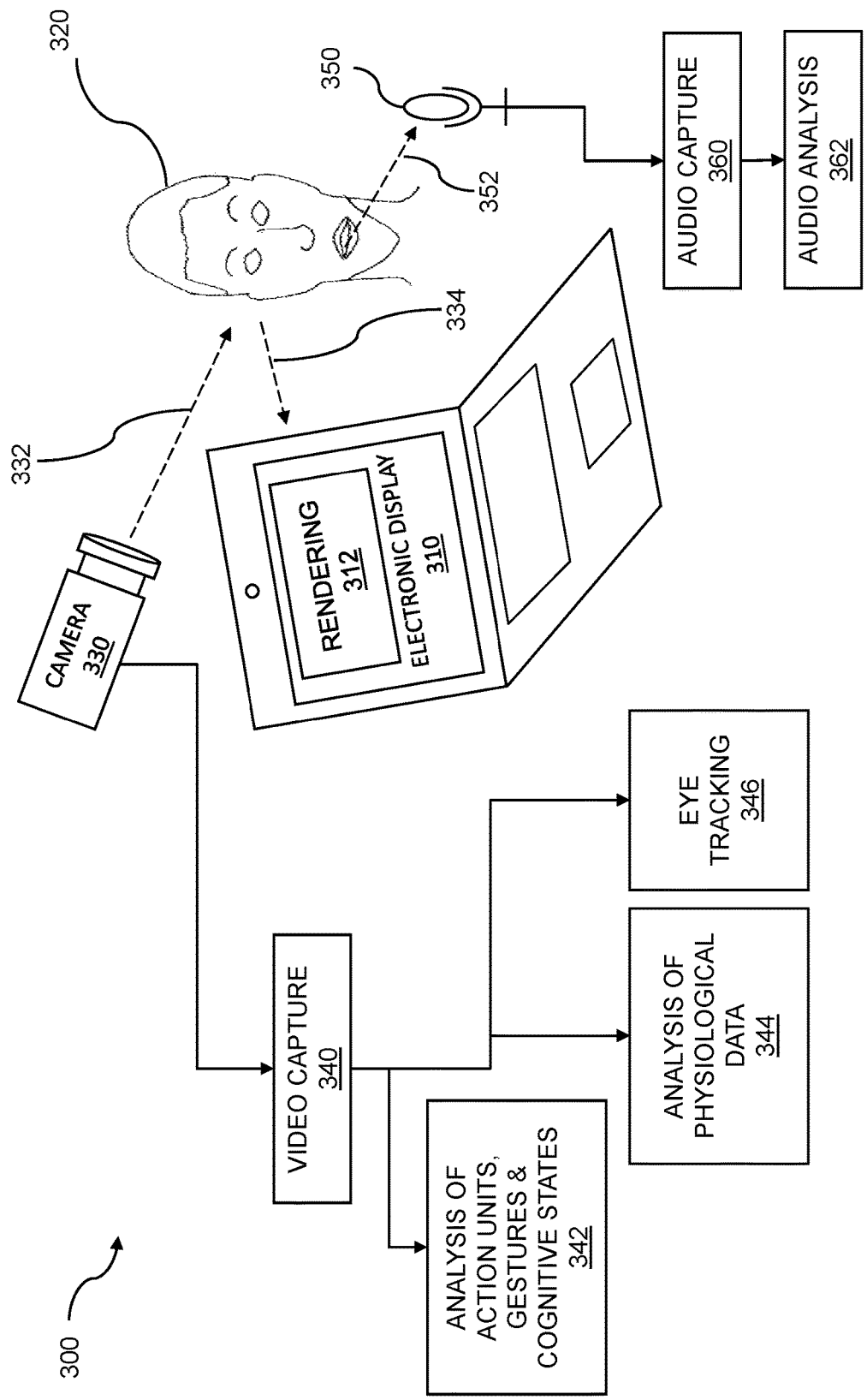
FIG. 3 shows facial image and voice capture.

FIG. 3 shows facial image and voice capture. Video data, including images of one or more people, is obtained. Audio data which corresponds to the video data is obtained. A face within the video data is identified, and a first voice from the audio data is associated with the face. The face within the video data is analyzed for cognitive content. An audio classifier is learned based on the analyzing of the face within the video data. The audio classifier is used for analyzing further audio data. In the system 300, an electronic display 310 can show a rendering 312 to a person 320 in order to collect facial data and/or other indications of cognitive state. In some embodiments, a webcam 330 is used to capture the facial data, although in other embodiments, a webcam 330 is used to capture one or more of the facial data and the physiological data. The facial data can include information on one or more of a group comprising facial expressions, action units, head gestures, smiles, brow furrows, squints, lowered eyebrows, raised eyebrows, and attention, in various embodiments. A webcam 330 can capture video, audio, and/or still images of the person 320. A webcam, as the term is used herein and in the claims, can be a video camera, still camera, thermal imager, CCD device, phone camera, three-dimensional camera, depth camera, or multiple webcams 330 used to show different views of the person 320. The electronic display 310 can be a computer display, a laptop screen, a mobile device display, a cell phone display, or some other electronic display. The rendering 312 can be a landing page, a checkout page, a webpage, a website, a web-enabled application, a video on a web-enabled application, a game on a web-enabled application, a virtual world, or some other output of a web-enabled application. The rendering 312 can also be a portion of what is displayed, such as a button, an advertisement, a banner ad, a dropdown menu, a data element on a web-enabled application, or another portion of the display. In some embodiments, the webcam 330 observes 332 the eyes of the person. For the purposes of this disclosure and claims, the word "eyes" can refer to either one or both eyes of an individual, or to any combination of one or both eyes of individuals in a group. The eyes can move as the rendering 312 is observed 334 by the person 320. The images of the person 320 from the webcam 330 can be captured by a video capture unit 340. In some embodiments video is captured, while in others, a series of still images is captured. The captured video or still images can be used in one or more pieces of analysis.

Analysis of action units, gestures, and cognitive states 342 can be accomplished using the captured images of the person 320. The action units can be used to identify smiles, frowns, and other facial indicators of cognitive states. The gestures, including head gestures, can indicate interest or curiosity. For example, a head gesture of moving toward the electronic display 310 can indicate increased interest or a desire for clarification. Based on the captured images, analysis of physiological data 344 can be performed. Respiration, heart rate, heart rate variability, perspiration, temperature, and other physiological indicators of cognitive state can be observed by analyzing the images. In various embodiments, a webcam is used to capture one or more of the facial data and the physiological data.

In some embodiments, a webcam is used to track the eyes. Tracking of eyes 346 to identify the rendering with which interacting can be performed. In some embodiments, the tracking of the eyes identifies a portion of the rendering on which the eyes are focused. Thus, various embodiments perform tracking of eyes to identify one of the rendering and a portion of the rendering, with which interacting is accomplished. In this manner, by tracking of eyes, cognitive states can be associated with a specific rendering or portion of the rendering. For example, if a button on a web page is unclear as to its function, a person can indicate confusion. By tracking of eyes, it will be clear that the confusion pertains to the button in question, rather than some other portion of the web page. Likewise, if a banner ad is present, by tracking of eyes, the portion of the banner ad which exhibits the highest arousal and positive valence can be determined. Further, in some embodiments, the process includes recording of eye dwell time on the rendering and associating information on the eye dwell time to the rendering and to the cognitive states. The eye dwell time can be used to augment the cognitive state information to indicate the level of interest in certain renderings or portion of renderings.

A microphone 350 is used to capture the audio data 352, in some embodiments. The microphone 350 can include a microphone tuned to pick up the human voice, a transducer, or another audio collection technique. The audio data 352 from the person 320 can be captured by the microphone 350 for analysis. The audio data can include feature information. The capturing 360 of the audio data 352 can include storing the audio data locally, remotely, on a cloud service, and so on. The audio data that is captured can be analyzed 362. The audio feature information can be analyzed based on learning an audio classifier. The learning can be based on using deep learning, where the deep learning can be used with unlabeled data. The learning can also be based on supervised learning, where the supervised learning can be used with labeled data. The learning encompasses a plurality of audio classifiers. In embodiments, the analyzing the first voice for features can include evaluation of prosody. Prosody can include patterns of rhythm and sound, patterns of stress and intonation, and so on. In embodiments, the analyzing the first voice for features can include analysis of vocal register and vocal resonance, pitch, speech loudness, or speech rate. Other analysis tasks can be performed. In embodiments, the analyzing the first voice for features includes language analysis. Similar analyses can be performed for other voices. The language analysis can be dependent on language content. The language content can provide a context.

Figure 4:
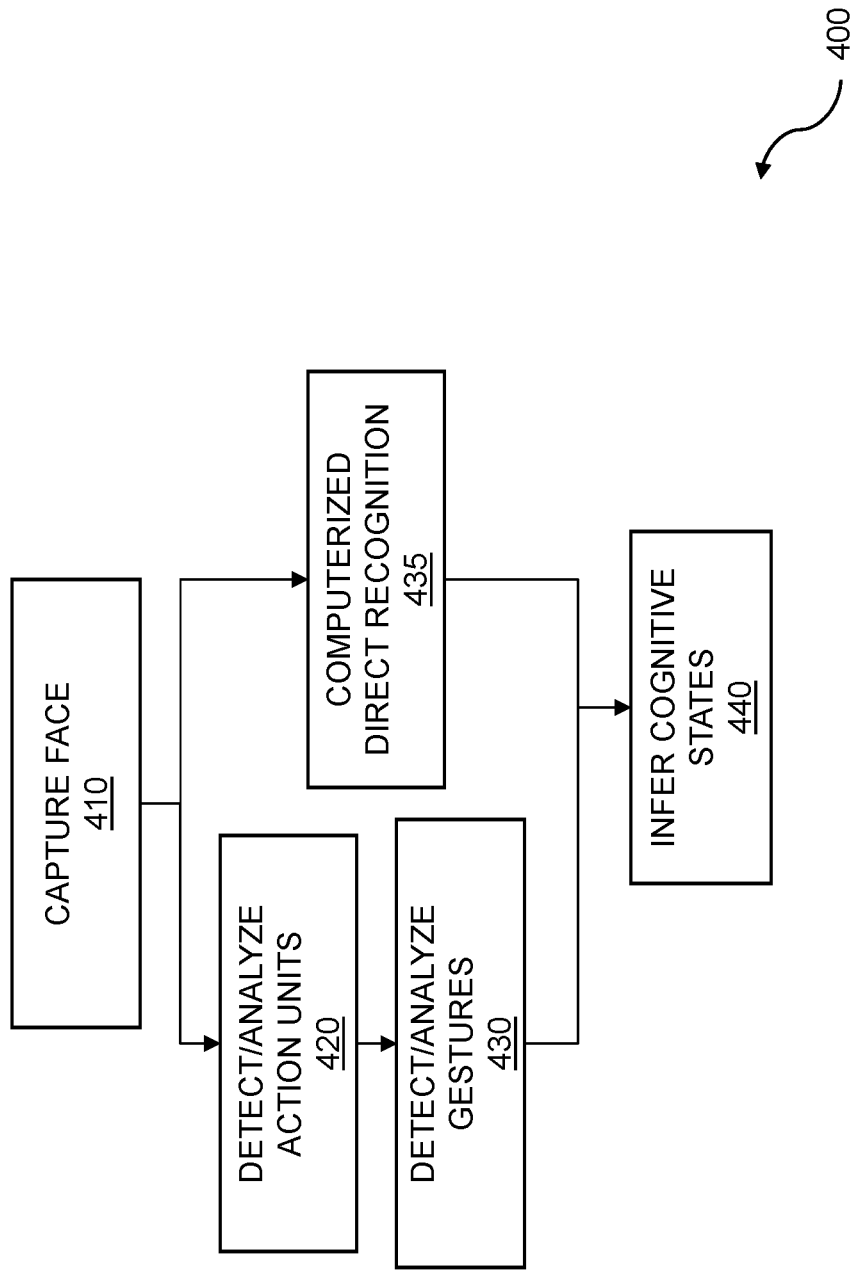
FIG. 4 is a flowchart for facial analysis.

FIG. 4 is a flow diagram for facial analysis. Video data is obtained, where the video data includes images of one or more people. Audio data which corresponds to the video data is also obtained. A face within the video data is identified, and a first voice from the audio data is associated with the face within the video data. The face within the video data is analyzed for cognitive content. An audio classifier is learned based on the analyzing of the face, and the audio classifier is used for analyzing further audio data. The flow 400 begins by capturing the face 410 of a person. The capture can be accomplished by video or by a series of still images. The flow 400 can include detection and analysis of action units 420. The action units can include the raising of an eyebrow, the raising of both eyebrows, a twitch of a smile, a furrowing of the eye brows, flaring of nostrils, squinting of the eyes, and many other possibilities. These action units can be automatically detected by a computer system analyzing the video. Alternatively, a combination of automatic detection by a computer system and human input can be provided to enhance the detection of the action units. The flow 400 can include detection and analysis of head and facial gestures 430. Gestures can include tilting the head to the side, leaning forward, smiling, frowning, as well as many other gestures.

In other embodiments, computerized direct recognition 435 of facial expressions and head gestures or cognitive states is performed. When direct recognition is performed, feature recognition and classification can be included in the process. An inferring of cognitive states 440 can be performed. Various steps in the flow 400 may be changed in order, repeated, omitted, or the like without departing from the disclosed concepts. Various embodiments of the flow 400 can be included in a computer program product embodied in a non-transitory computer readable medium that includes code executable by one or more processors.

Figure 5:
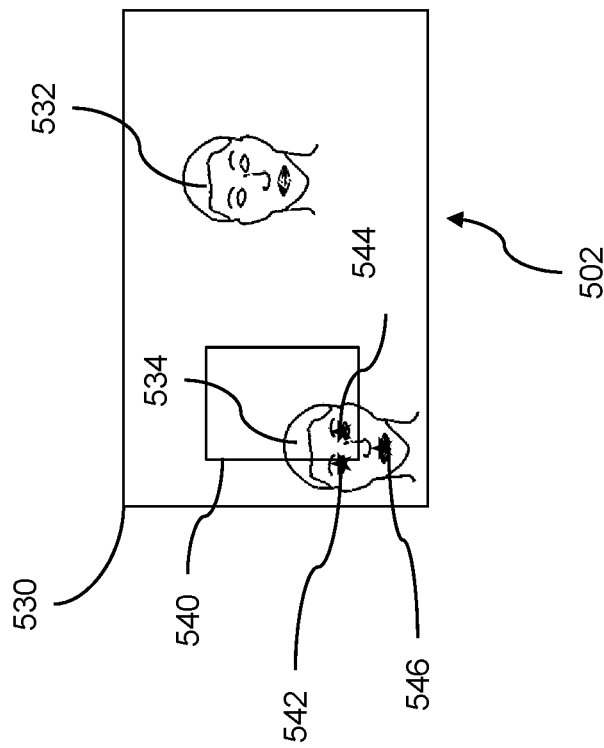
FIG. 5 shows face detection for multiple faces.
Figure 5:
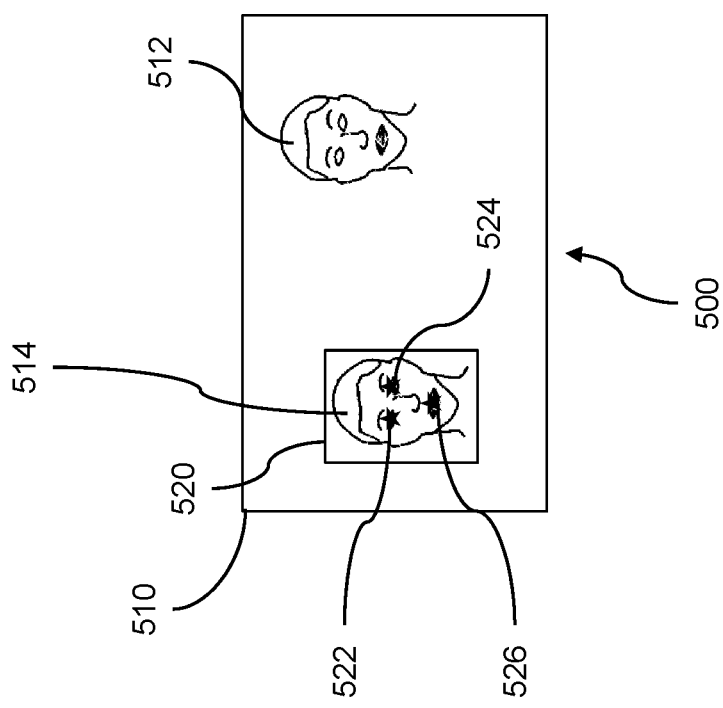

FIG. 5 shows face detection for multiple faces. Face detection for one or more faces can be used for audio analysis learning using video data. Video data including images of one or more people is obtained. Audio data which corresponds to the video data is obtained. A face within the video data is identified, and a first voice is associated with the face. The face within the video data is analyzed for cognitive content. An audio classifier based on the analyzing of the face is learned. The audio classifier is used for analyzing further audio data. The learning can include machine learning and can be performed within a deep learning environment. The feature extraction for multiple faces can be performed for faces that can be detected in multiple images. A plurality of images of an individual viewing an electronic display can be received. A face can be identified in an image, based on the use of classifiers. The plurality of images can be evaluated to determine cognitive states and/or facial expressions of the individual. The feature extraction can be performed by analysis using one or more processors, using one or more video collection devices, and by using a server. The analysis device can be used to perform face detection for a second face, as well as for facial tracking of the first face. One or more videos can be captured, where the videos contain one or more faces. The video or videos that contain the one or more faces can be partitioned into a plurality of frames, and the frames can be analyzed for the detection of the one or more faces. The analysis of the one or more video frames can be based on one or more classifiers. A classifier can be an algorithm, heuristic, function, or piece of code that can be used to identify into which of a set of categories a new or particular observation, sample, datum, etc., should be placed. The decision to place an observation into a category can be based on training the algorithm or piece of code by analyzing a known set of data, known as a training set. The training set can include data for which category memberships of the data can be known. The training set can be used as part of a supervised training technique. If a training set is not available, then a clustering technique can be used to group observations into categories. The latter approach, or unsupervised learning, can be based on a measure (i.e. distance) of one or more inherent similarities among the data that is being categorized. When the new observation is received, then the classifier can be used to categorize the new observation. Classifiers can be used for many analysis applications, including analysis of one or more faces. The use of classifiers can be the basis of analyzing the one or more faces for demographic data such as gender, ethnicity, and age; for detection of one or more faces in one or more videos; for detection of facial features; for detection of facial landmarks; and so on. The observations can be analyzed based on one or more of a set of quantifiable properties. The properties can be described as features and explanatory variables and can include various data types such as numerical (integer-valued, real-valued), ordinal, categorical, and so on. Some classifiers can be based on a comparison between an observation and prior observations. Classifiers can also be based on functions such as a similarity function, a distance function, and so on.

Classification can be based on various types of algorithms, heuristics, codes, procedures, statistics, and so on. Many techniques for performing classification exist. This classification of observations into one or more groups can be based on probabilities and distributions of the data values. Classifiers can be binary, multiclass, linear, and so on. There are many algorithms for classification which can be implemented using a variety of techniques, including neural networks, kernel estimation, support vector machines, use of quadratic surfaces. Classification can be used in many application areas such as computer vision, speech and handwriting recognition, etc. Classification can be used for biometric identification of one or more people in one or more frames of one or more videos.

Returning to FIG. 5, the detection of the first face, the second face, and multiple faces can include identifying cognitive content, generating a bounding box, and predicting of a bounding box and landmarks for a next frame, where the next frame can be one of a plurality of frames of a video containing faces. A first video frame 500 includes a frame boundary 510, a first face 512, and a second face 514. The video frame 500 also includes a bounding box 520. Facial landmarks can be generated for the first face 512. Face detection can be performed to initialize a second set of locations for a second set of facial landmarks for a second face within the video. Facial landmarks in the video frame 500 can include the facial landmarks 522, 524, and 526. The facial landmarks can include corners of a mouth, corners of eyes, eyebrow corners, the tip of the nose, nostrils, chin, the tips of ears, and so on. The performing of face detection on the second face can include performing facial landmark detection with the first frame from the video for the second face and can include estimating a second rough bounding box for the second face based on the facial landmark detection. The estimating of a second rough bounding box can include the bounding box 520. Bounding boxes can also be estimated for one or more other faces within the boundary 510. The bounding box can be refined, as can one or more facial landmarks. The refining of the second set of locations for the second set of facial landmarks can be based on localized information around the second set of facial landmarks. The bounding box 520 and the facial landmarks 522, 524, and 526 can be used to estimate future locations for the second set of locations for the second set of facial landmarks in a future video frame from the first video frame.

A second video frame 502 is also shown. The second video frame 502 includes a frame boundary 530, a first face 532, and a second face 534. The second video frame 502 also includes a bounding box 540 and the facial landmarks 542, 544, and 546. In other embodiments, multiple facial landmarks are generated and used for facial tracking of the two or more faces of a video frame, such as the shown second video frame 502. Facial points from the first face can be distinguished from other facial points. In embodiments, the other facial points include facial points of one or more other faces. The facial points can correspond to the facial points of the second face. The distinguishing of the facial points of the first face and the facial points of the second face can be used to distinguish between the first face and the second face, to track either or both of the first face and the second face, and so on. Other facial points can correspond to the second face. As mentioned above, multiple facial points within a frame can be determined. One or more of the other facial points that are determined can correspond to a third face. The location of the bounding box 540 can be estimated, where the estimating can be based on the location of the generated bounding box 520 shown in the first video frame 500. The three facial landmarks shown, facial landmarks 542, 544, and 546, might lie within the bounding box 540 or might not lie partially or completely within the bounding box 540. For instance, the second face 534 might have moved between the first video frame 500 and the second video frame 502. Based on the accuracy of the estimating of the bounding box 540, a new estimation can be determined for a third, future frame from the video, and so on. The evaluation can be performed, all or in part, on semiconductor-based logic. The evaluation can be used to learn an audio classifier based on analyzing a face within video data.

Figure 6:
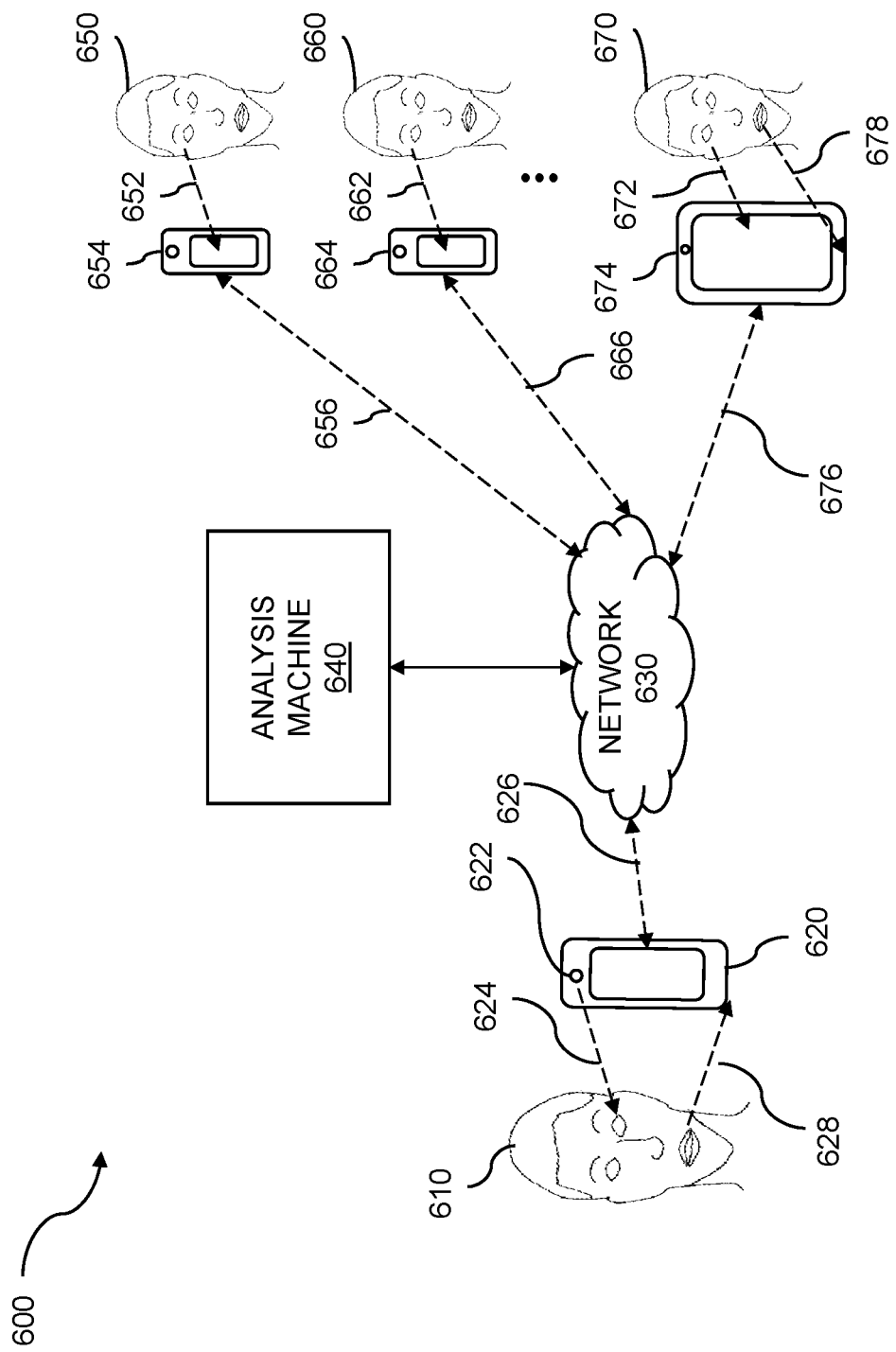
FIG. 6 illustrates live streaming of social video and social audio.

FIG. 6 illustrates live streaming of social video and social audio. The streaming of social video and social audio can be applied to audio analysis learning using video data. Based on captured video data and corresponding audio data, a face is identified and a voice is associated with the face. The face is analyzed for cognitive content. An audio classifier is learned and applied to further audio data. The streaming and analysis of the video data and the audio data can be facilitated by a video capture device, a local server, a remote server, a semiconductor-based logic, and so on. The streaming can be live streaming and can include cognitive state analysis and cognitive state event signature analysis. Live streaming video is an example of one-to-many social media, where video can be sent over a network such as the Internet from one person to a plurality of people using a social media app and/or platform. Live streaming is one of numerous popular techniques used by people who want to disseminate ideas, send information, provide entertainment, and share experiences. Some of the live streams can be scheduled, such as webcasts, online classes, sporting events, news, computer gaming, or video conferences, while others can be impromptu streams that are broadcast as needed or when desired. Examples of impromptu live stream videos can range from individuals simply wanting to share experiences with their social media followers, to live coverage of breaking news, emergencies, or natural disasters. The latter coverage is known as mobile journalism, or "mo jo", and is becoming increasingly common. With this type of coverage, news reporters can use networked, portable electronic devices to provide mobile journalism content to a plurality of social media followers. Such reporters can be quickly and inexpensively deployed as the need or desire arises.

Several live streaming social media apps and platforms can be used for transmitting video. One such video social media app is Meerkat™ which can link with a user's Twitter™ account. Meerkat™ enables a user to stream video using a handheld, networked electronic device coupled to video capabilities. Viewers of the live stream can comment on the stream using tweets that can be seen and responded to by the broadcaster. Another popular app is Periscope™ which can transmit a live recording from one user to his or her Periscope™ account and to other followers. The Periscope™ app can be executed on a mobile device. The user's Periscope™ followers can receive an alert whenever that user begins a video transmission. Another live-stream video platform is Twitch™ which can be used for video streaming of video gaming and broadcasts of various competitions and events.

The example 600 shows a user 610 broadcasting a video live stream and an audio live stream to one or more people as shown by a first person 650, a second person 660, and a third person 670. A portable, network-enabled, electronic device 620 can be coupled to a front-facing camera 622. The portable electronic device 620 can be a smartphone, a PDA, a tablet, a laptop computer, and so on. The camera 622 coupled to the device 620 can have a line-of-sight view 624 to the user 610 and can capture video of the user 610. The portable electronic device 620 can be coupled to a microphone (not shown). The microphone can capture voice data 628 such as speech and non-speech vocalizations. In embodiments, non-speech vocalizations can include grunts, yelps, squeals, snoring, sighs, laughter, filled pauses, unfilled pauses, yawns, or the like. The captured video and audio can be sent to an analysis or recommendation machine 640 using a network link 626 to network 630. The network link, such as the Internet, can be a wireless link, a wired link, and so on. The analysis machine 640 can recommend to the user 610 an app and/or platform that can be supported by the server and can be used to provide a video live stream, an audio live stream, or both a video live stream and an audio live stream to one or more followers of the user 610.

In the example 600, the user 610 has three followers: a first person 650, a second person 660, and a third person 670. Each follower has a line-of-sight view to a video screen on a portable, networked electronic device. In other embodiments, one or more followers follow the user 610 using any other networked electronic device, including a computer. In the example 600, a first person 650 has a line-of-sight view 652 to the video screen of a device 654; a second person 660 has a line-of-sight view 662 to the video screen of a device 664, and a third person 670 has a line-of-sight view 672 to the video screen of a device 674. The device 674 can also capture audio data 678 from the third person 670. The portable electronic devices 654, 664, and 674 can each be a smartphone, a PDA, a tablet, and so on. Each portable device can receive the video stream and the audio stream being broadcast by the user 610 through the network 630 using the app and/or platform that can be recommended by the analysis machine 640. The device 654 can receive a video stream and the audio stream using the network link 656, the device 664 can receive a video stream and the audio stream using the network link 666, the device 674 can receive a video stream and the audio stream using the network link 676. The network link can be a wireless link, a wired link, a hybrid link, and so on. Depending on the app and/or platform that can be recommended by the analysis machine 640, one or more followers, such as the followers shown 650, 660, and 670, can reply, comment, or otherwise provide feedback to the user 610 using their respective devices 654, 664, and 674. The replies from one or more followers can include text messages (SMS), audio, such as audio 678 from follower 670, email, an emoji, and so on.

Figure 7:
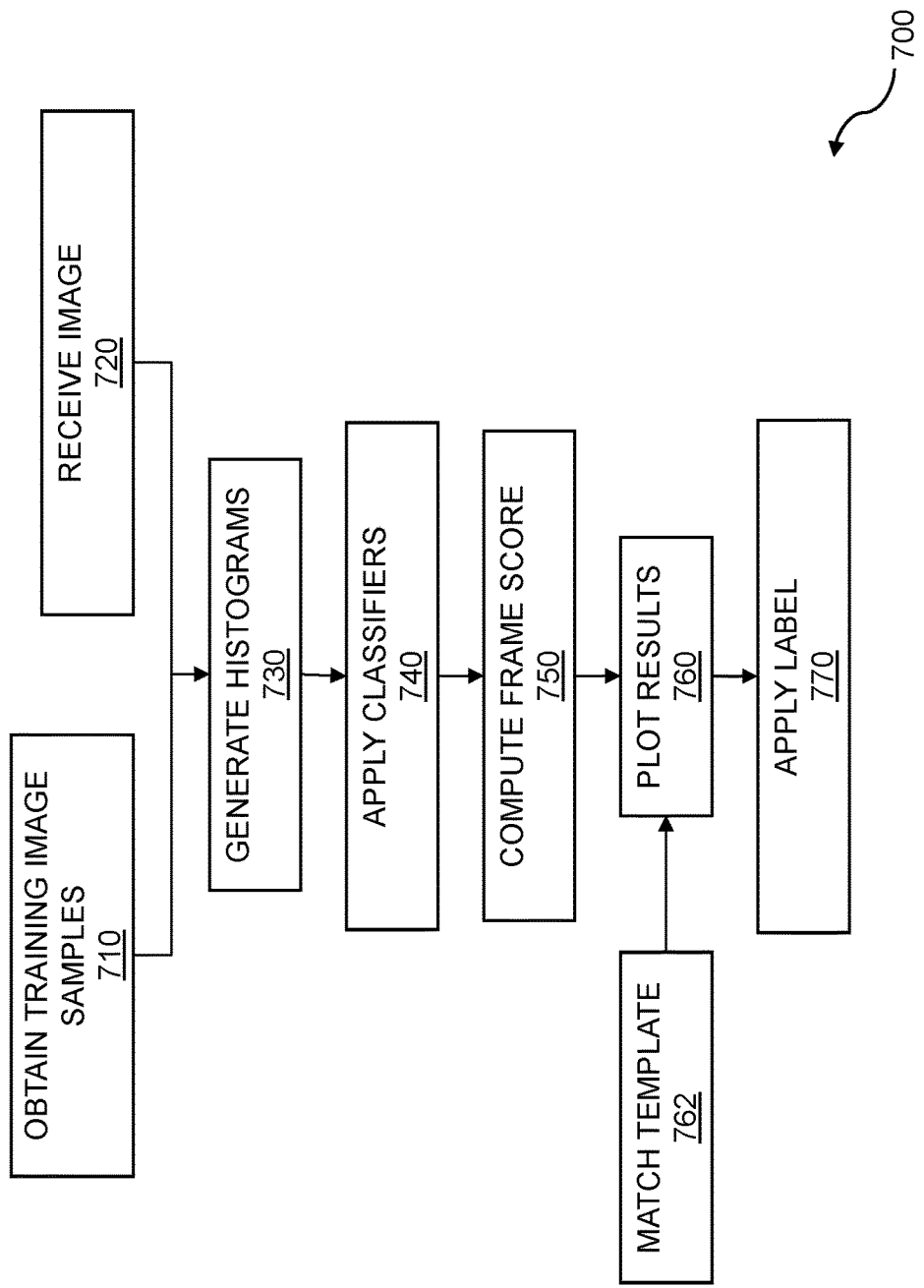
FIG. 7 is a flow diagram for detecting facial expressions.

FIG. 7 is a flow diagram for detecting facial expressions. Detection of facial expressions can support audio analysis learning using video data. Video data of one or more people is obtained, and audio data which corresponds to the video data is also obtained. A face within the video data is identified, and a first voice is associated with the face within the video data. The face within the video data is analyzed for cognitive content. An audio classifier is learned based on the analyzing of the face, and the audio classifier is used for analyzing further audio data. The flow 700, or portions thereof, can be implemented in semiconductor logic, accomplished using a mobile device accomplished using a server device, and so on. The flow 700 can be used to automatically detect a wide range of facial expressions. A facial expression can produce strong cognitive signals that can indicate valence and discrete cognitive states. The discrete cognitive states can include discrete emotional states. The discrete emotional states can include contempt, doubt, defiance, happiness, fear, and anxiety. The detection of facial expressions can be based on determination of action units (AU), where the action units are determined using FACS coding. The AUs can be used singly or in combination to identify facial expressions. One or more AUs can be identified by number and intensity. For example, AU12 can be used to code a lip corner puller and to infer a smirk.

The flow 700 begins by obtaining training image samples 710. The image samples can include a plurality of images of one or more people. Human coders who are trained to correctly identify AU codes based on the FACS can code the images. The training, or "known good" images, can be used as a basis for training a machine learning technique. Once trained, the machine learning technique can be used to identify AUs in other images that are collected using a camera, a sensor, and so on. The flow 700 continues with receiving an image 720. The image 720 can be received from a camera, a sensor, and so on. As previously discussed, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The image that is received can be manipulated in order to improve the processing of the image. For example, the image can be cropped, scaled, stretched, rotated, flipped, etc. in order to obtain a resulting image that can be analyzed more efficiently. Multiple versions of the same image can be analyzed. In some cases, the manipulated image and a flipped or mirrored version of the manipulated image can be analyzed alone and/or in combination to improve analysis. The flow 700 continues with generating histograms 730 for the training images and the one or more versions of the received image. The histograms can be based on a HoG or another histogram. As described in previous paragraphs, the HoG can include feature descriptors and can be computed for one or more regions of interest in the training images and the one or more received images. The regions of interest in the images can be located using facial landmark points, where the facial landmark points can include outer edges of nostrils, outer edges of the mouth, outer edges of eyes, etc. A HoG for a given region of interest can count occurrences of gradient orientation within a given section of a frame from a video.

The flow 700 continues with applying classifiers 740 to the histograms. The classifiers can be used to estimate probabilities, where the probabilities can correlate with an intensity of an AU or an expression. In some embodiments, the choice of classifiers used is based on the training of a supervised learning technique to identify facial expressions. The classifiers can be used to identify into which of a set of categories a given observation can be placed. The classifiers can be used to determine a probability that a given AU or expression is present in a given image or frame of a video. In various embodiments, the one or more AUs that are present include AU01 inner brow raiser, AU12 lip corner puller, AU38 nostril dilator, and so on. In practice, the presence or absence of multiple AUs can be determined. The flow 700 continues with computing a frame score 750. The score computed for an image, where the image can be a frame from a video, can be used to determine the presence of a facial expression in the image or video frame. The score can be based on one or more versions of the image 720 or a manipulated image. The score can be based on a comparison of the manipulated image to a flipped or mirrored version of the manipulated image. The score can be used to predict a likelihood that one or more facial expressions are present in the image. The likelihood can be based on computing a difference between the outputs of a classifier used on the manipulated image and on the flipped or mirrored image, for example. The classifier can be used to identify symmetrical facial expressions (e.g. smile), asymmetrical facial expressions (e.g. outer brow raiser), and so on.

The flow 700 continues with plotting results 760. The results that are plotted can include one or more scores for one or more frames computed over a given time t. For example, the plotted results can include classifier probability results from analysis of HoGs for a sequence of images and video frames. The plotted results can be matched with a template 762. The template can be temporal and can be represented by a centered box function or another function. A best fit with one or more templates can be found by computing a minimum error. Other best-fit techniques can include polynomial curve fitting or geometric curve fitting. The flow 700 continues with applying a label 770. The label can be used to indicate that a particular facial expression has been detected in the one or more images or video frames which constitute the image 720 that was received. The label can be used to indicate a cognitive state. The label can be used to indicate that any of a range of facial expressions has been detected, including a smile, an asymmetric smile, a frown, and so on. Various steps in the flow 700 may be changed in order, repeated, omitted, or the like without departing from the disclosed concepts. Various embodiments of the flow 700 can be included in a computer program product embodied in a non-transitory computer readable medium that includes code executable by one or more processors. Various embodiments of the flow 700, or portions thereof, can be included on a semiconductor chip and implemented in special purpose logic, programmable logic, and so on. Various steps in the flow 700 may be changed in order, repeated, omitted, or the like without departing from the disclosed concepts.

Figure 8:
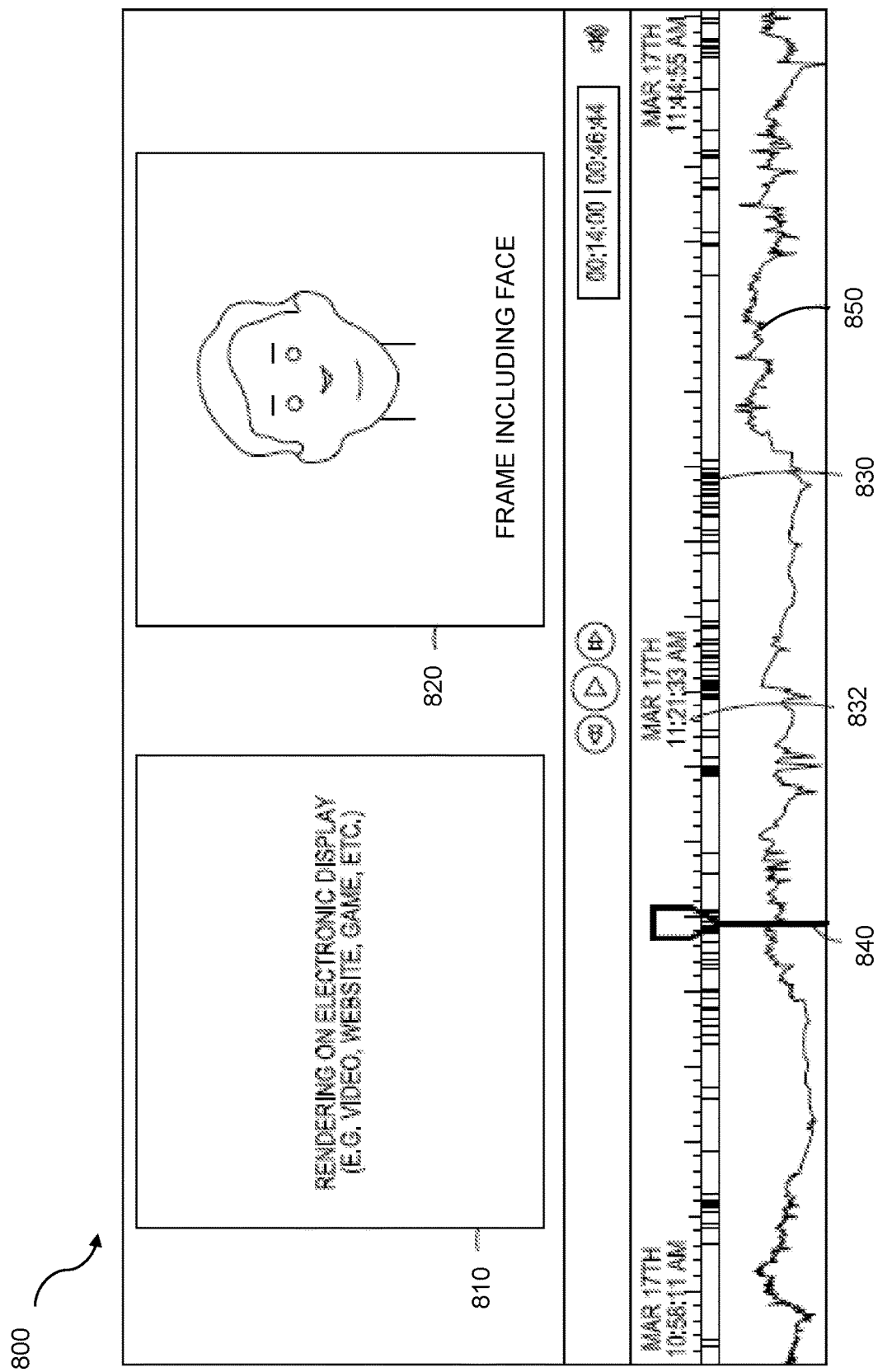
FIG. 8 illustrates video track decomposition.

FIG. 8 illustrates video track decomposition. Video track decomposition can support audio analysis learning using video data. A face can be identified within obtained video data, and a voice within obtained audio data can be associated with the face. The face within the video data can be analyzed for cognitive content, where the cognitive content can include cognitive states, mental states, and emotional states. An audio classifier is learned based on the analysis of the face. Further audio data is analyzed using the audio classifier.

A window 800 can be shown which includes, for example, display of a rendering 810, a frame 820 including a face identified from obtained video data, a facial expression track 830, a timeline 832, and a slide bar 840. The facial expression track can include cognitive content. The facial expression track can include expressions such as a smile, a smirk, a frown, a grimace, and so on. In some embodiments, the window 800 includes physiological data, such as an electrodermal activity track 850. Numerous other displays of information are possible as well. Each of the elements mentioned can be shown in the window 800 or can be shown in another floating window. The frame 820 includes a face of a person identified in the obtained video data. In some embodiments, an avatar is used to represent the person who viewed the rendering without showing video of the person. By using an avatar, a person's identity can be removed or hidden, while indications of facial expressions such as smiling, frowning, laughing, and other facial expressions can remain visible. The shown avatar can represent just a face, an entire head, an upper body, or a whole person. The decomposition of the video data can include analyzing the video data and partitioning the video data into video frames. In other embodiments, the decomposition of the video data includes partitioning, organizing, categorizing and otherwise decomposing the video data by attributes identified in the video data such as facial expressions, demographic data such as gender, age, race, hair color, eye color, identifiable characteristics such as moles and scars, and so on.

Figure 9:
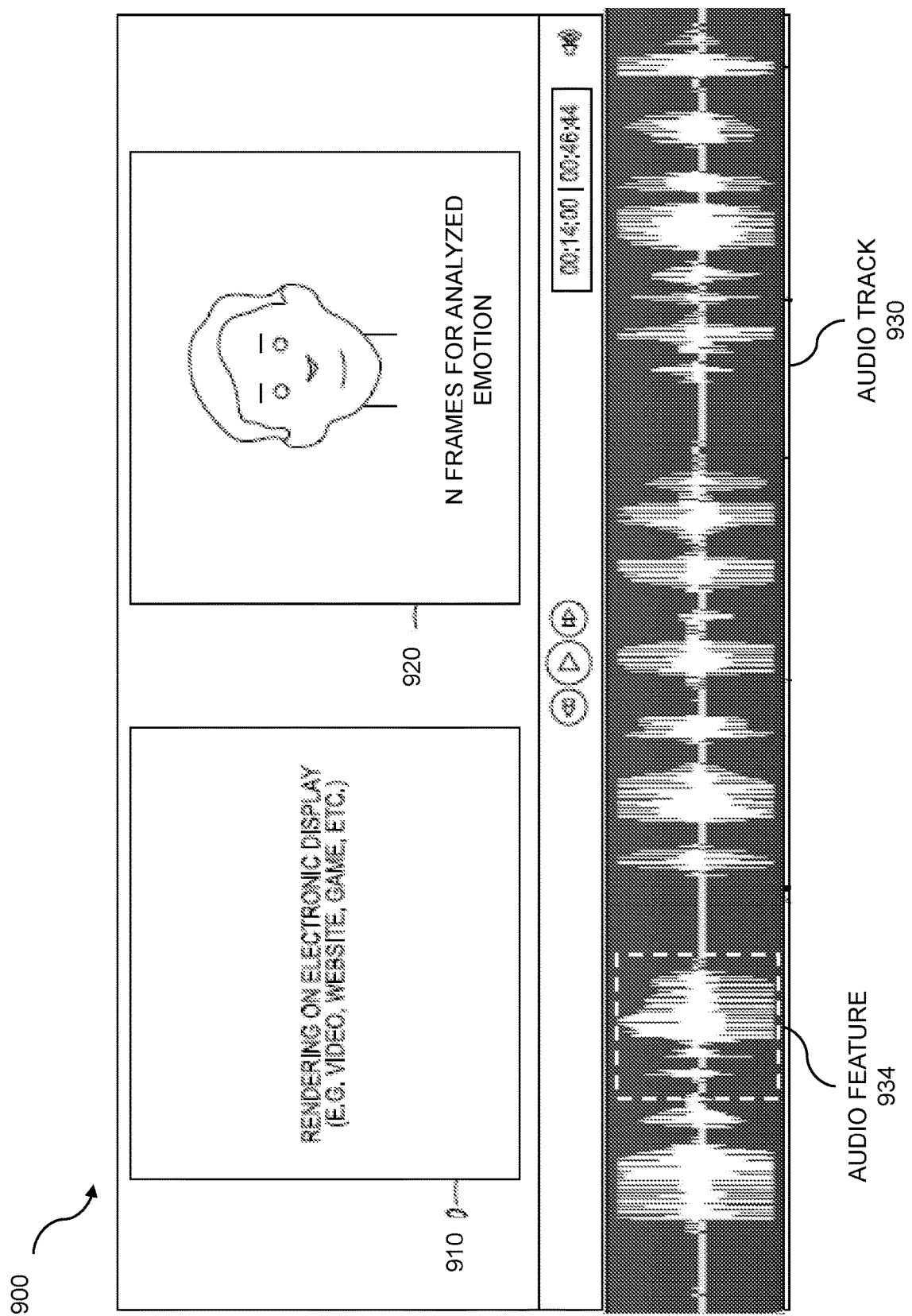
FIG. 9 shows audio segmentation.

FIG. 9 shows audio segmentation. Video data is obtained, where the video data includes images of one or more people. Audio data corresponding to the video data is obtained. A face within the video data is identified, and a first voice is associated with the face. The face within the video data is analyzed for cognitive content. An audio classifier is learned based on the analyzing of the face within the video data. A window 900 can be rendered on a display and can include a rendering 910 of a video, video data, a website, a game, and so on. The window 900 can include one or more frames (N frames) 920 such as video frames, where a frame can include a face that was identified from the obtained video data. The window 900 can include an audio track 930. The audio track can include audio data, where the audio data can be a voice. The voice from the audio data can be associated with the face in the frame 920. The window 900 can include an audio feature 934. The audio feature can be extracted from the audio data and can correspond to cognitive content of the video. The audio feature can evaluate timbre and prosody. Other audio features can be extracted. In embodiments, the audio feature can include analyzing the first voice for features such as vocal register and vocal resonance, pitch, speech volume, or speech rate. The audio feature can also analyze speech volume, speech rate, and language, where language analysis can be dependent on language content. The one or more audio features can be evaluated, analyzed, etc., based on the voice associated with the face within the video data.

The audio segmentation can include multi-modal cognitive sensing, where the multi-modal cognitive sensing can include video modes, audio modes, and so on. The audio data can include speech data. Analysis of audio data can be based on a learned audio classifier, where the audio classifier can be learned based on analyzing of the face within the video data. The audio-video cognitive sensing can be based on datasets that can include cognition labels. In embodiments, the cognition labels are automatically annotated. Facial expressions can be leveraged to provide supervision for learning cognition tags on the speech channel. The leveraging can be based on the natural synchrony between the face and the speech for expressing emotions.

Figure 10:
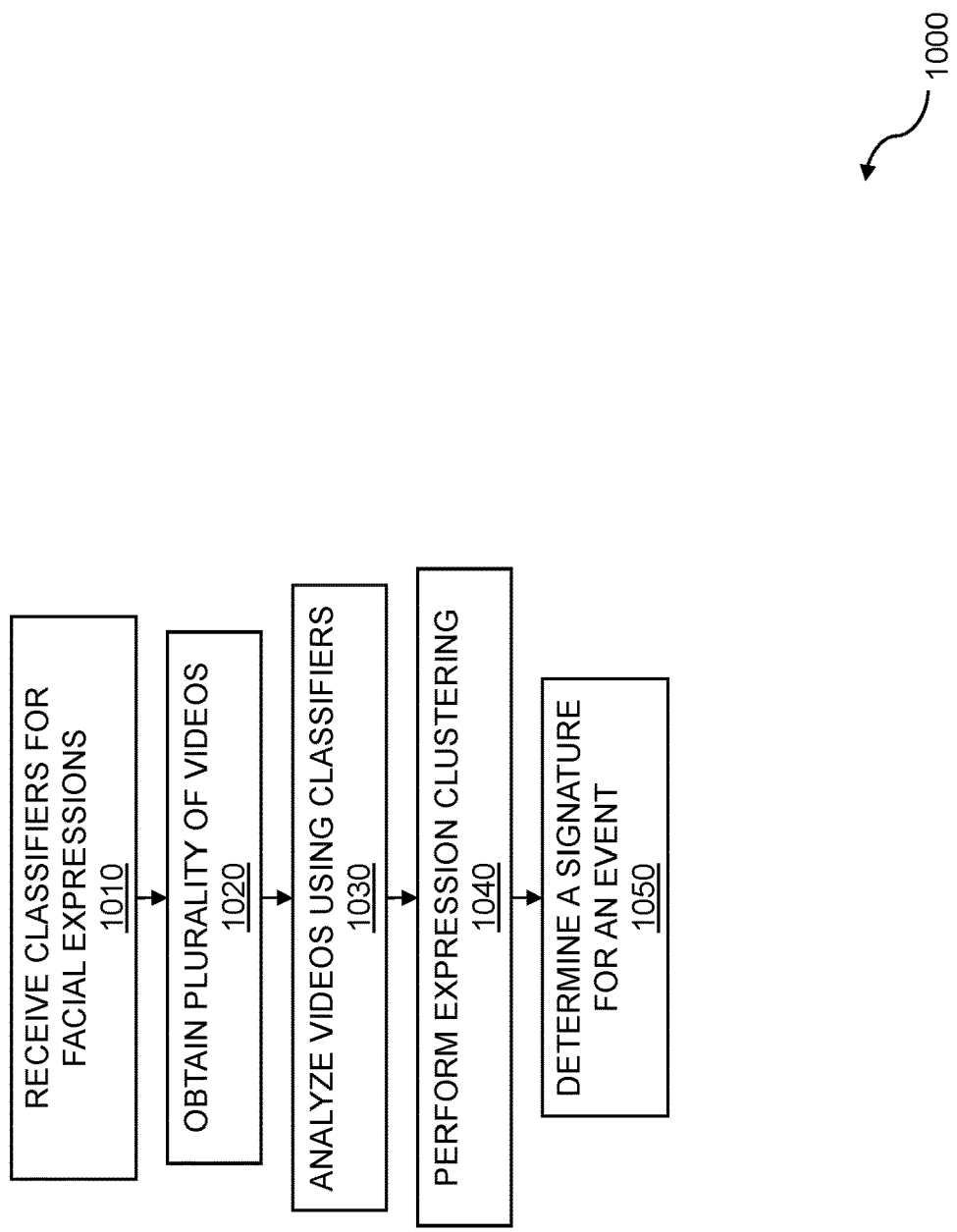
FIG. 10 is a flow diagram for cognitive state event definition from a device perspective.

FIG. 10 is a flow diagram for cognitive state event definition from a device perspective. Video data is obtained, where the video data includes images of one or more people. Audio data which corresponds to the video data is obtained. A face within the video data is identified, and a first voice, from the audio data, is associated with the face within the video data. The face within the video data is analyzed for cognitive content. An audio classifier is learned based on the analyzing of the face within the video data. The device can be used both to obtain a plurality of videos of people and to process the plurality of videos for the purposes of determining a signature for an event. The device can be a mobile device, and can include a laptop computer, a tablet computer, a smartphone, a PDA, a wearable computer, and so on. The flow 1000 includes receiving classifiers for facial expressions 1010. The classifiers can be stored on the mobile device, entered into the mobile device by a user of the mobile device, or received using wired and wireless techniques. The classifiers can be small and/or simple enough to be used within the computational restrictions of the device, where the computational restrictions of the device can include processing power, storage size, etc.

The flow 1000 further includes obtaining a plurality of videos of people 1020. The videos which are obtained can include video data on the plurality of people as the people experience an event. The people can experience the event by viewing the event on an electronic display, and the event can include watching a media presentation. The video of the people can be obtained from any mobile video capture device, including a webcam attached to a laptop computer, a camera on a tablet or smart phone, a camera on a wearable device, etc. The obtained videos on the plurality of people can be stored on the mobile device.

The flow 1000 includes analyzing the plurality of videos using the classifiers 1030. The device performing the analysis can use the classifiers to identify a category into which the video data can be binned. The categories into which the video data are binned can include a category for facial expressions. The facial expressions can include smiles, smirks, squints, and so on. The classifiers can be stored on the device performing the analysis, loaded into the device, or provided by a user of the device. The results of the analysis can be stored on the device.

The flow 1000 includes performing expression clustering 1040 based on the analyzing. The expression clustering can be based on the analysis of the plurality of videos of people. The expressions which are used for the expression clustering can include facial expressions, where the facial expressions can include smiles, smirks, brow furrows, squints, lowered eyebrows, raised eyebrows, attention, and so on. The expressions which are used for the expression clustering can also include inner brow raisers, outer brow raisers, brow lowerers, upper lid raisers, cheek raisers, lid tighteners, and lips toward each other, among many others. The results of the expression clustering can be stored on the device.

The flow 1000 includes determining a signature for an event 1050 based on the expression clustering. As was the case for the server-based system, the signature which is determined can be based on several criteria, including a time duration of a peak, an intensity of a peak, a shape of a transition of an intensity from a low intensity to a peak intensity or from a peak intensity to a low intensity, and so on. The signature can be tied to a type of event, where the event can include viewing a media presentation such as a movie trailer. The signature can be used to infer a cognitive state, where the cognitive state can include one or more of sadness, stress, anger, and happiness. The signature which is determined can be stored on the device. Various steps in the flow 1000 may be changed in order, repeated, omitted, or the like without departing from the disclosed concepts. Various embodiments of the flow 1000 may be included in a computer program product embodied in a non-transitory computer readable medium that includes code executable by one or more processors.

Figure 11:
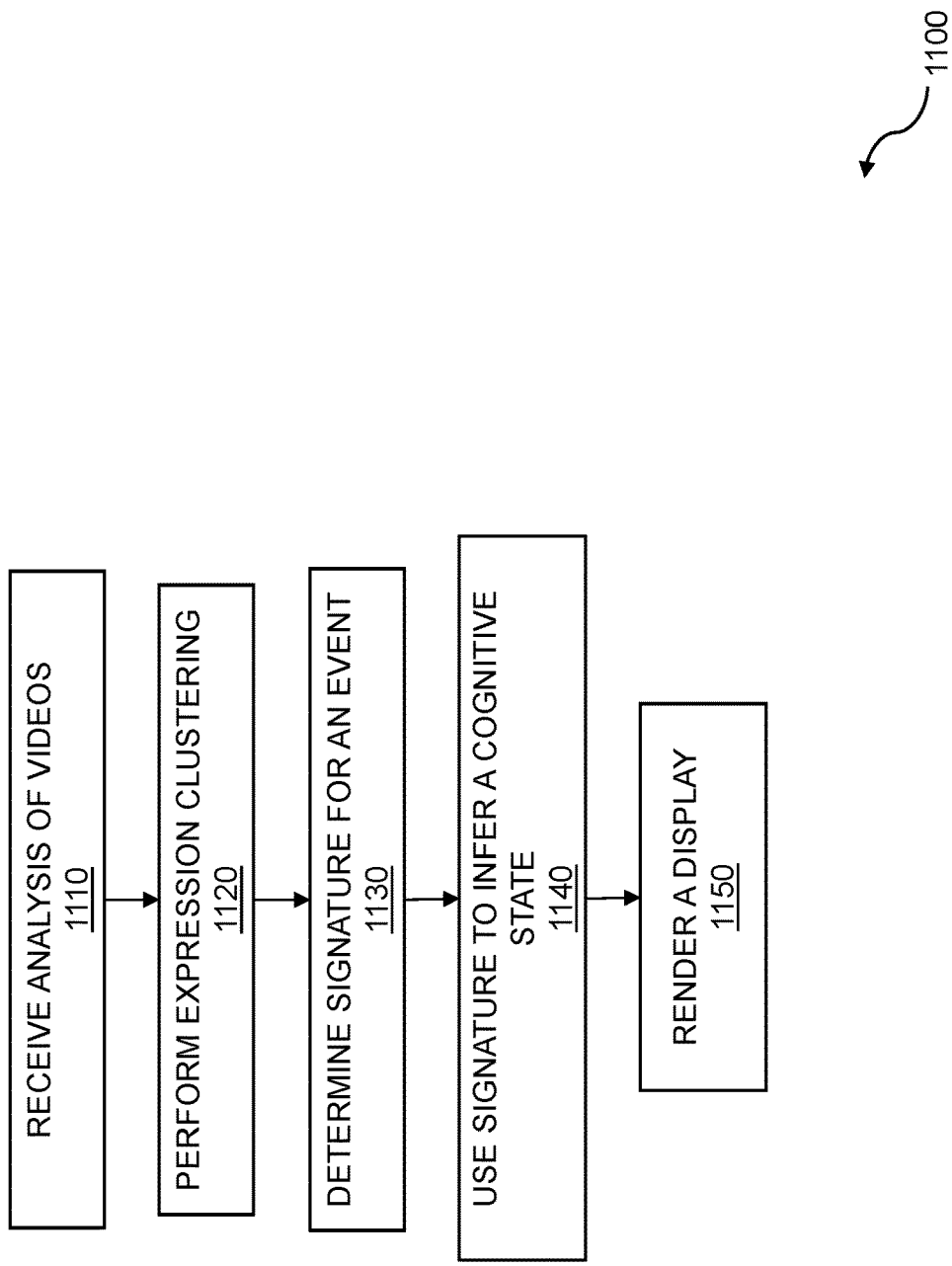
FIG. 11 is a flow diagram for rendering an inferred cognitive state.

FIG. 11 is a flow diagram for rendering an inferred cognitive state. Video data is obtained, where the video data includes images of one or more people. Audio data which corresponds to the video data is obtained. A face within the video data is identified, and a first voice, from the audio data, is associated with the face within the video data. The face within the video data is analyzed for cognitive content. An audio classifier is learned based on the analyzing of the face within the video data. The cognitive content from the audio classifier, the audio data, etc., can be rendered. The analysis and rendering can be performed on any appropriate device including a server, a desktop computer, a laptop computer, a tablet, a smartphone, a PDA, a wearable computer, and so on. The device which performs the analysis and the rendering can be used to process the video data and the audio data for the purposes of determining a signature for an event, as well as to render the signatures and other analysis results on a display. The display can be any type of electronic display, including a television monitor, a projector, a computer monitor (including a laptop screen, a tablet screen, a net book screen, etc.), a projection apparatus, and the like. The display can be a cell phone display, a smartphone display, a mobile device display, a tablet display, or another electronic display. The flow 1100 includes receiving analysis of a plurality of videos of people 1110. The analysis data can be stored in the analysis device, read into the analysis device, or entered by the user of the analysis device.

The flow 1100 includes performing expression clustering 1120 based on the analyzing. The expression clustering can be based on the analysis of the plurality of videos of people. The expressions which are used for the expression clustering can include facial expressions. The facial expressions for the clustering can include smiles, smirks, brow furrows, squints, lowered eyebrows, raised eyebrows, and attention. The expression clustering can also include various facial expressions and head gestures. The results of the expression clustering can be stored on the device for subsequent rendering, for further analysis, etc.

The flow 1100 includes determining a signature for an event 1130. The determining of the signature can be based on the expression clustering. As previously discussed, the signature which is determined can be based on several criteria, including a time duration of a peak, an intensity of a peak, a shape of a transition from a low intensity to a peak intensity or from a peak intensity to a low intensity, and so on. The signature can be tied to a type of event, where the event can include viewing a media presentation. The media presentation can include a movie trailer, advertisement, and/or instructional video, to name a few.

The flow 1100 includes using a signature to infer a cognitive state 1140. The cognitive state can be the cognitive state of an individual, or it can be a cognitive state shared by a plurality of people. The cognitive state or cognitive states can result from the person or people experiencing an event or situation. The situation can include a media presentation such as TV programs, movies, video clips, and other such media. The cognitive states can be based on the cognitive content. The signature which is determined can be stored on the device for further analysis, signature determination, rendering, and so on.

The flow 1100 includes rendering a display 1150. The rendering of the display can include rendering video data, analysis data, emotion cluster data, signature data, and so on. The rendering can be displayed on any type of electronic display. The electronic display can include a computer monitor, a laptop display, a tablet display, a smartphone display, a wearable display, a mobile display, a television, or a projector. Various steps in the flow 1100 may be changed in order, repeated, omitted, or the like without departing from the disclosed concepts. Various embodiments of the flow 1100 may be included in a computer program product embodied in a non-transitory computer readable medium that includes code executable by one or more processors.

The human face provides a powerful communications medium through its ability to exhibit numerous expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters, including affect valence, spontaneous reactions, facial action units, and so on can be determined. The parameters that are determined can be used to infer or predict emotional and cognitive states. For example, determined valence can be used to describe the emotional reaction of a viewer to a video media presentation or another type of presentation. Positive valence provides evidence that a viewer is experiencing a favorable emotional response to the video media presentation, while negative valence provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt-in" to the facial data collection. For example, the person can agree to the capture of facial data using a personal device such as a mobile device or another electronic device by selecting an opt-in choice. Opting-in can then turn on the person's webcam-enabled device and can begin the capture of the person's facial data via a video feed from the webcam or other camera. The video data that is collected can include one or more persons experiencing an event. The one or more persons can be sharing a personal electronic device or can each be using one or more devices for video capture. The videos can be collected using a web-based framework. The web-based framework can be used to display the video media presentation or event as well as to collect videos from any number of viewers who are online. That is, the collection of videos can be crowdsourced from those viewers who elected to opt-in to the video data collection.

The videos captured from the various viewers who chose to opt-in can be substantially different in terms of video quality, frame rate, etc. As a result, the facial video data can be scaled, rotated, and otherwise adjusted to improve consistency. Human factors further influence the capture of the facial video data. The facial data that is captured might or might not be relevant to the video media presentation being displayed. For example, the viewer might not be paying attention, might be fidgeting, might be distracted by an object or event near the viewer, or might be otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include such items as eyeglasses (because of reflections), eye patches, jewelry, and clothing that occludes or obscures the viewer's face. Similarly, a viewer's hair or hair covering can present artifacts by obscuring the viewer's eyes and/or face. The viewer's face can be partially or fully occluded. Partial occlusion of a viewer's mouth can result from the viewer covering their yawning mouth with a hand.

The captured facial data can be analyzed using the facial action coding system (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers, but it can also be performed on automated, computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision-making. For example, the AUs can be used to recognize emotions experienced by the observed person. Emotion-related facial actions can be identified using the emotional facial action coding system (EM-FACS) and the facial action coding system affect interpretation dictionary (FACSAID). For a given emotion, specific action units can be related to the emotion. For example, the emotion of anger can be related to AUs 4, 5, 7, and 23, while happiness can be related to AUs 6 and 12. Other mappings of emotions to AUs have also been previously associated. The coding of the AUs can include an intensity scoring that ranges from A (trace) to E (maximum). The AUs can be used for analyzing images to identify patterns indicative of a particular cognitive and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity is evaluated and specific emotions, moods, or cognitive states can be identified.

The coding of faces identified in videos captured of people observing an event can be automated. The automated systems can detect facial AUs or discrete emotional states. The emotional states can include amusement, fear, anger, disgust, surprise, and sadness, for example. The automated systems can be based on a probability estimate from one or more classifiers, where the probabilities can correlate with an intensity of an AU or an expression. The classifiers can be used to identify into which of a set of categories a given observation can be placed. For example, the classifiers can be used to determine a probability that a given AU or expression is present in a given frame of a video. The classifiers can be used as part of a supervised machine learning technique where the machine learning technique can be trained using "known good" data. Once trained, the machine learning technique can proceed to classify new data that is captured.

The supervised machine learning models can be based on support vector machines (SVMs). An SVM can have an associated learning model that is used for both data analysis and pattern analysis. For example, an SVM can be used to classify data that can be obtained from collected videos of people experiencing a media presentation. An SVM can be trained using "known good" data that is labeled as belonging to one of two categories (e.g. smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HoG) can be computed. The HoG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HoG for a given region of interest can count occurrences of gradient orientation within a given section of a frame from a video, for example. The gradients can be intensity gradients and can be used to describe an appearance and a shape of a local object. The HoG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from illumination or shadowing changes between and among video frames. The HoG can be computed on the image or on an adjusted version of the image, where the adjustment of the image can include scaling, rotation, etc. For example, the image can be adjusted by flipping the image around a vertical line through the middle of a face in the image. The symmetry plane of the image can be determined from the tracker points and landmarks of the image.

In an embodiment, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including symmetric smiles, unilateral smiles, asymmetric smiles, and so on. The trained system can then be used to automatically code the facial data collected from a plurality of viewers experiencing video presentations (e.g. television programs).

Spontaneous asymmetric smiles can be detected in order to understand viewer experiences. Related literature indicates that as many asymmetric smiles occur on the right hemi face as do on the left hemi face, for spontaneous expressions. Detection can be treated as a binary classification problem, where images that contain a right asymmetric expression are used as positive (target class) samples, and all other images are used as negative (non-target class) samples. Classifiers perform the classification, including classifiers such as support vector machines (SVM) and random forests. Random forests can include ensemble-learning methods that use multiple learning algorithms to obtain better predictive performance. Frame-by-frame detection can be performed to recognize the presence of an asymmetric expression in each frame of a video. Facial points can be detected, including the top of the mouth and the two outer eye corners. The face can be extracted, cropped, and warped into a pixel image of a specific dimension (e.g. 96×96 pixels). In embodiments, the inter-ocular distance and vertical scale in the pixel image are fixed. Feature extraction can be performed using computer vision software such as OpenCV™. Feature extraction can be based on the use of HoGs. HoGs can include feature descriptors and can be used to count occurrences of gradient orientation in localized portions or regions of the image. Other techniques can be used for counting occurrences of gradient orientation, including edge orientation histograms, scale-invariant feature transformation descriptors, etc. The AU recognition tasks can also be performed using Local Binary Patterns (LBP) and Local Gabor Binary Patterns (LGBP). The HoG descriptor represents the face as a distribution of intensity gradients and edge directions, and is robust in its ability to translate and scale. Differing patterns, including groupings of cells of various sizes which are arranged in variously sized cell blocks, can be used. For example, 4×4 cell blocks of 8×8 pixel cells with an overlap of half of the block can be used. Histograms of channels can be used, including nine channels or bins evenly spread over 0-180 degrees. In this example, the HoG descriptor on a 96×96 image is 25 blocks×16 cells×9 bins=3600, the latter quantity representing the dimension. AU occurrences can be rendered. The videos can be grouped into demographic datasets based on nationality and/or other demographic parameters for further detailed analysis.

Figure 12:
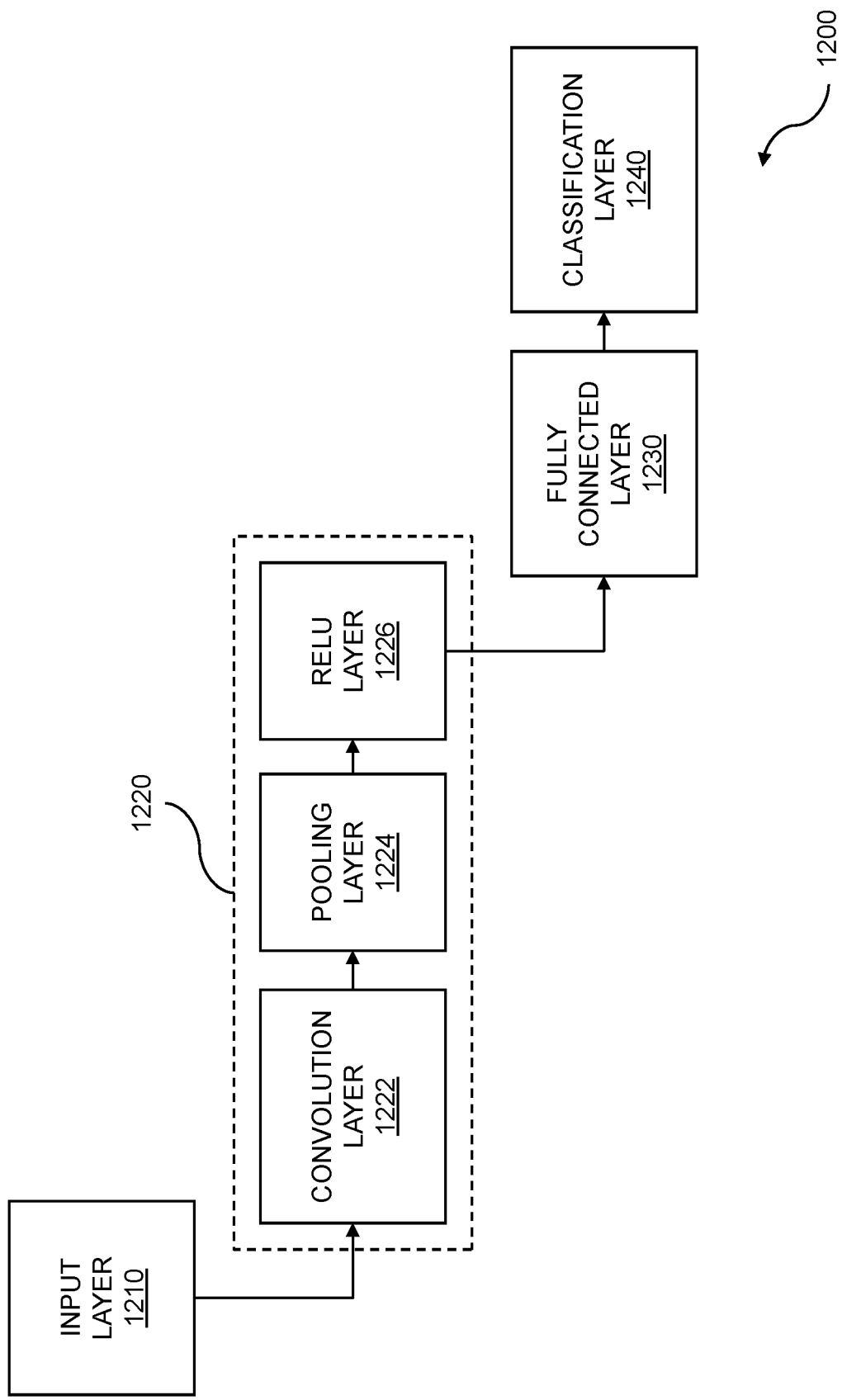
FIG. 12 is an example showing a convolutional neural network (CNN).

FIG. 12 is an example showing a convolutional neural network (CNN). The convolutional neural network can be used for deep learning, where the deep learning can be applied to audio analysis learning using video data. An audio classifier can be learned based on analyzing a face within the video data. The audio classifier can be used for analyzing further audio data. The convolutional neural network can be applied to such tasks as cognitive state analysis, mental state analysis, mood analysis, emotional state analysis, and so on. Cognitive state data can include mental processes, where the mental processes can include attention, creativity, memory, perception, problem solving, thinking, use of language, or the like.

Cognitive analysis is a very complex task. Understanding and evaluating moods, emotions, mental states, or cognitive states, requires a nuanced evaluation of facial expressions or other cues generated by people. Cognitive state analysis is important in many areas such as research, psychology, business, intelligence, and law enforcement. The understanding of cognitive states can also be useful for a variety of business purposes, such as improving marketing analysis, assessing the effectiveness of customer service interactions and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g. fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences and analyzing faces in the audience, a computer-implemented method and system can process thousands of faces to assess the cognitive state at the time of the scary scenes. In many ways, such an analysis can be more effective than surveys that ask audience members questions, since audience members may consciously or subconsciously change answers based on peer pressure or other factors. Spontaneous facial expressions can be more difficult to conceal. Thus, by analyzing facial expressions en masse in real time, important information regarding the general cognitive state of the audience can be obtained.

Analysis of facial expressions is also a complex task. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, cognitive states, and physiological data. Facial data as contained in the raw video data can include information on one or more of action units, head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including the physiological data can be collected, where the physiological data can be obtained using a camera or other image capture device, without contacting the person or persons. Respiration, heart rate, heart rate variability, perspiration, temperature, and other physiological indicators of cognitive state can be determined by analyzing the images and video data.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include such things as differentiating dogs from cats and identifying different human faces. The image data applications can include identifying cognitive states, moods, mental states, emotional states, and so on, from the facial expressions of the faces that are identified. Audio data applications can include analyzing audio such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, volume, speech rate, or language content. The voice data analysis can be used to determine one or more cognitive states, moods, mental states, emotional states, etc.

The artificial neural network, such as a convolutional neural network, which forms the basis for deep learning is based on layers. The layers can include an input layer, a convolution layer, a fully connected layer, a classification layer, and so on. The input layer can receive input data such as image data, where the image data can include a variety of formats including pixel formats. The input layer can then perform processing such as identifying boundaries of the face, identifying landmarks of the face, extracting features of the face, and/or rotating a face within the plurality of images. The convolution layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of cognitive state. The last layer of the convolutional neural network can be the final classification layer. The output of the final classification layer can be indicative of the cognitive states of faces within the images that are provided to the input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the second layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to the next layer. Weights adjust the output of one layer as it is fed to the next layer. When the final layer is reached, the output of the final layer can be a facial expression, a cognitive state, a mental state, a characteristic of a voice, and so on. The facial expression can be identified using a hidden layer from the one or more hidden layers. The weights can be provided on inputs to the multiple layers to emphasize certain facial features. The convolutional neural network can be trained to identify facial expressions and voice characteristics. The training can include assigning weights to inputs on one or more layers within the multilayered analysis engine. One or more of the weights can be adjusted or updated during training. The assigning of weights can be accomplished during a feed-forward pass through the multilayered neural network. In a feed-forward arrangement, the information moves forward from the input nodes, through the hidden nodes, and on to the output nodes. Additionally, the weights can be updated during a backpropagation process through the multilayered analysis engine.

Returning to the figure, FIG. 12 is an example showing a convolutional neural network 1200. The convolutional neural network can be used for deep learning, where the deep learning can be applied to avatar image animation using translation vectors. The deep learning system can be accomplished using a convolution neural network or other techniques. The deep learning can accomplish facial recognition and analysis tasks. The network includes an input layer 1210. The input layer 1210 receives image data. The image data can be input in a variety of formats, such as JPEG, TIFF, BMP, and GIF. Compressed image formats can be decompressed into arrays of pixels, wherein each pixel can include an RGB tuple. The input layer 1210 can then perform processing tasks such as identifying boundaries of the face, identifying landmarks of the face, extracting features of the face, and/or rotating a face within the plurality of images.

The network includes a collection of intermediate layers 1220. The multilayered analysis engine can include a convolutional neural network. Thus, the intermediate layers can include a convolution layer 1222. The convolution layer 1222 can include multiple sublayers, including hidden layers within it. The output of the convolution layer 1222 feeds into a pooling layer 1224. The pooling layer 1224 performs a data reduction, which makes the overall computation more efficient. Thus, the pooling layer reduces the spatial size of the image representation to decrease the number of parameters and computations in the network. In some embodiments, the pooling layer is implemented using a 2×2 filter size, applied with a stride of two samples for every depth slice along both width and height, resulting in a reduction of 75-percent of the downstream node activations. The multilayered analysis engine can further include a max pooling layer 1224. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or an L2-norm pooling layer. Various other pooling schemes are possible.

The intermediate layers can include a Rectified Linear Units (RELU) layer 1226. The output of the pooling layer 1224 can be input to the RELU layer 1226. In embodiments, the RELU layer implements an activation function such as $f(x)=\max(0,x)$, thus providing an activation with a threshold at zero. In some embodiments, the RELU layer 1226 is a leaky RELU layer. In this case, instead of the activation function providing zero when x<0, a small negative slope is used, resulting in an activation function such as $f(x)=1(x<0)(\alpha x)+1(x>=0)(x)$. This can reduce the risk of "dying RELU" syndrome, where portions of the network can be "dead" with nodes/neurons that do not activate across the training dataset. The image analysis can comprise training a multilayered analysis engine using the plurality of images, wherein the multilayered analysis engine can include multiple layers that include one or more convolutional layers 1222 and one or more hidden layers, and wherein the multilayered analysis engine can be used for emotional analysis.

The example 1200 includes a fully connected layer 1230. The fully connected layer 1230 processes each pixel/data point from the output of the collection of intermediate layers 1220. The fully connected layer 1230 takes all neurons in the previous layer and connects them to every single neuron it has. The output of the fully connected layer 1230 provides input to a classification layer 1240. The output of the classification layer 1240 provides a facial expression and/or cognitive state as its output. Thus, a multilayered analysis engine such as the one depicted in FIG. 12 processes image data using weights, models the way the human visual cortex performs object recognition and learning, and analyzes the image data to infer facial expressions and cognitive states.

Machine learning for generating parameters and analysis of data such as facial data and audio data can be based on a variety of computational techniques. Generally, machine learning can be used for constructing algorithms and models. The constructed algorithms, when executed, can be used to make a range of predictions relating to data. The predictions can include whether an object in an image is a face, a box, or a puppy, whether a voice is female, male, or robotic, whether a message is legitimate email or a "spam" message, and so on. The data can include large quantities of unstructured data. The algorithms that can be generated by machine learning techniques are particularly useful to data analysis because the instructions that comprise the data analysis technique do not need to be static. The machine learning algorithm or model which is generated by the machine learning technique can adapt. Adaptation of the learning algorithm can be based on a range of criteria such as success rate, failure rate, and so on. A successful algorithm is one that can adapt—or learn—as more data is presented to the algorithm. Initially, an algorithm can be "trained" by presenting it with a set of known data (supervised learning). Another approach, called unsupervised learning, can be used to identify trends and patterns within data. Unsupervised learning is not trained using known data prior to data analysis.

Reinforced learning is an approach to machine learning that is inspired by behaviorist psychology. The underlying premise of reinforced learning (also called reinforcement learning) is that software agents can take actions in an environment. The actions that are taken by the agents should maximize a goal such as a "cumulative reward". A software agent is a computer program that acts on behalf of a user or other program. The software agent is implied to have the authority to act on behalf of the user or program. The actions taken are decided by action selection to determine what to do next. In machine learning, the environment in which the agents act can be formulated as a Markov decision process (MDP). The MDPs provide a mathematical framework for modeling of decision making in environments where the outcomes can be partly random (stochastic) and partly under the control of the decision maker. Dynamic programming techniques can be used for reinforced learning algorithms. Reinforced learning is different from supervised learning in that correct input/output pairs are not presented, and sub-optimal actions are not explicitly corrected. Rather, on-line or computational performance is the focus. On-line performance includes finding a balance between exploration of new (uncharted) territory or spaces, and exploitation of current knowledge. That is, there is a tradeoff between exploration and exploitation.

Machine learning based on reinforced learning adjusts or learns based on learning an action or a combination of actions, and so on. An outcome results from taking an action. Thus, the learning model, algorithm, etc., learns from the outcomes that result from taking the action or combination of actions. The reinforced learning can include identifying positive outcomes, where the positive outcomes are used to adjust the learning models, algorithms, and so on. A positive outcome can be dependent on a context. When the outcome is based on a mood, emotional state, mental state, cognitive state, etc., of an individual which is positive, the model and algorithm can be adjusted. Positive outcomes can include a person being more engaged, where engagement is based on affect, the person spending more time playing an online game or navigating a webpage, the person converting by buying a product or service, and so on. The reinforced learning can be based on exploring a solution space and adapting the model, algorithm, etc., based on outcomes of the exploration. When positive outcomes are encountered, the positive outcomes can be reinforced by changing weighting values within the model, algorithm, etc. Positive outcomes may result in increasing weighting values. Negative outcomes can also be considered, where weighting values may be reduced or otherwise adjusted.

Figure 13:
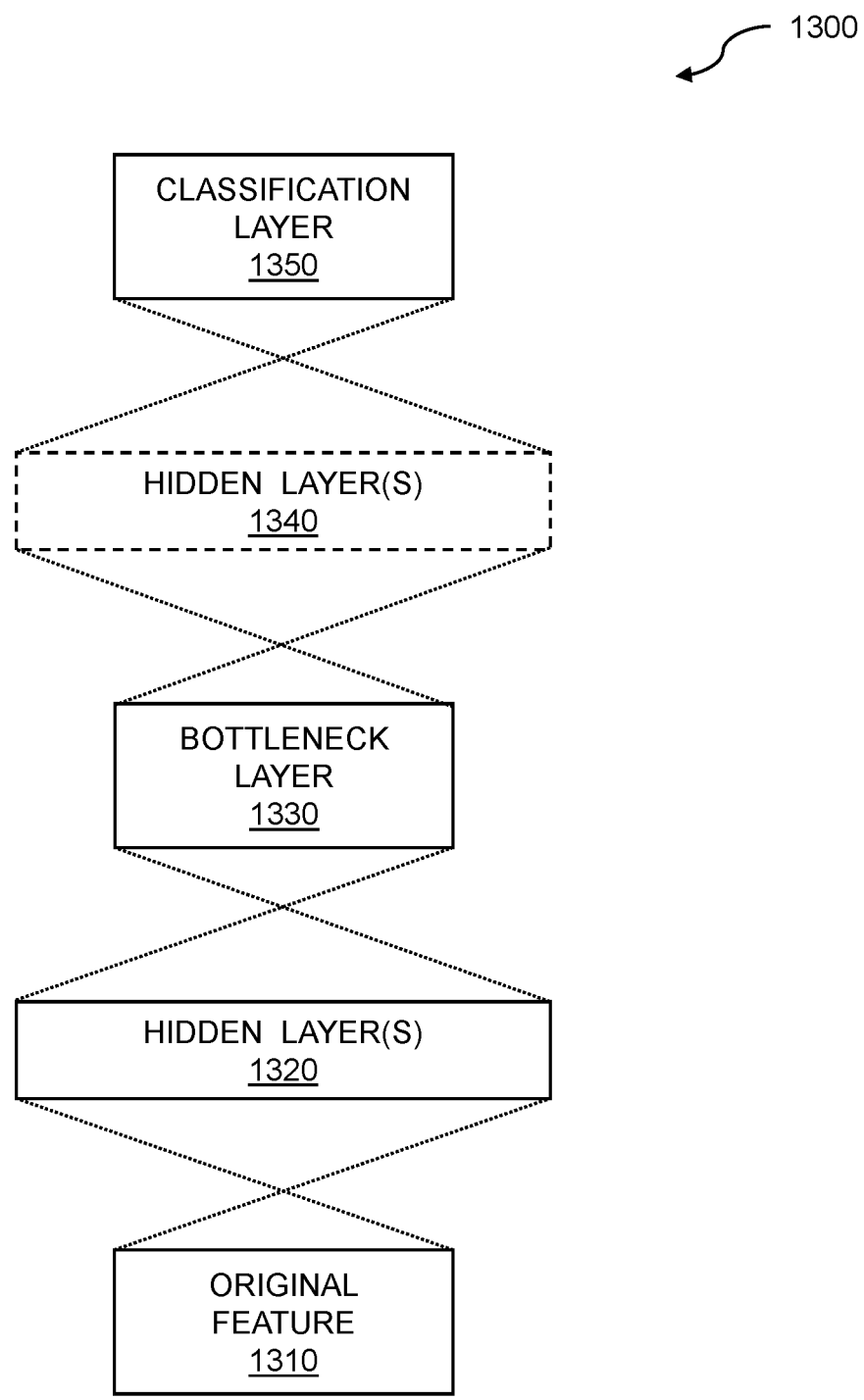
FIG. 13 illustrates a bottleneck layer within a deep learning environment.

FIG. 13 illustrates a bottleneck layer within a deep learning environment. A bottleneck layer can be a layer of a deep neural network, and can be used for audio analysis learning using video data. A deep neural network can apply audio classifiers. The audio classifiers are learned from analyzed facial data for a face within the video data. Video data that includes images of one or more people is obtained. Audio data that corresponds to the video data is also obtained. A face is identified within the video data, and a voice from the audio data is associated with the face. Using the learned audio classifiers, further audio data is analyzed.

Layers of a deep neural network can include a bottleneck layer 1300. A bottleneck layer can be used for a variety of applications such as facial recognition, voice recognition, emotional state recognition, and so on. The deep neural network in which the bottleneck layer is located can include a plurality of layers. The plurality of layers can include an original feature layer 1310. A feature such as an image feature can include points, edges, objects, boundaries between and among regions, properties, and so on. The deep neural network can include one or more hidden layers 1320. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to an emotional or expressive face or voice. In some cases, individual bottleneck layers can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 1330. The bottleneck layer can include a fewer number of nodes than the one or more preceding hidden layers. The bottleneck layer can create a constriction in the deep neural network or other network. The bottleneck layer can force information that is pertinent to a classification into a low dimensional representation. The bottleneck features can be extracted using an unsupervised technique. In other embodiments, the bottleneck features can be extracted in a supervised manner. The supervised technique can include training the deep neural network with a known dataset. The features can be extracted from an autoencoder such as a variational autoencoder, a generative autoencoder, and so on. The deep neural network can include hidden layers 1340. The count of the hidden layers can include zero hidden layers, one hidden layer, a plurality of hidden layers, and so on. The hidden layers following the bottleneck layer can include more nodes than the bottleneck layer. The deep neural network can include a classification layer 1350. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 14:
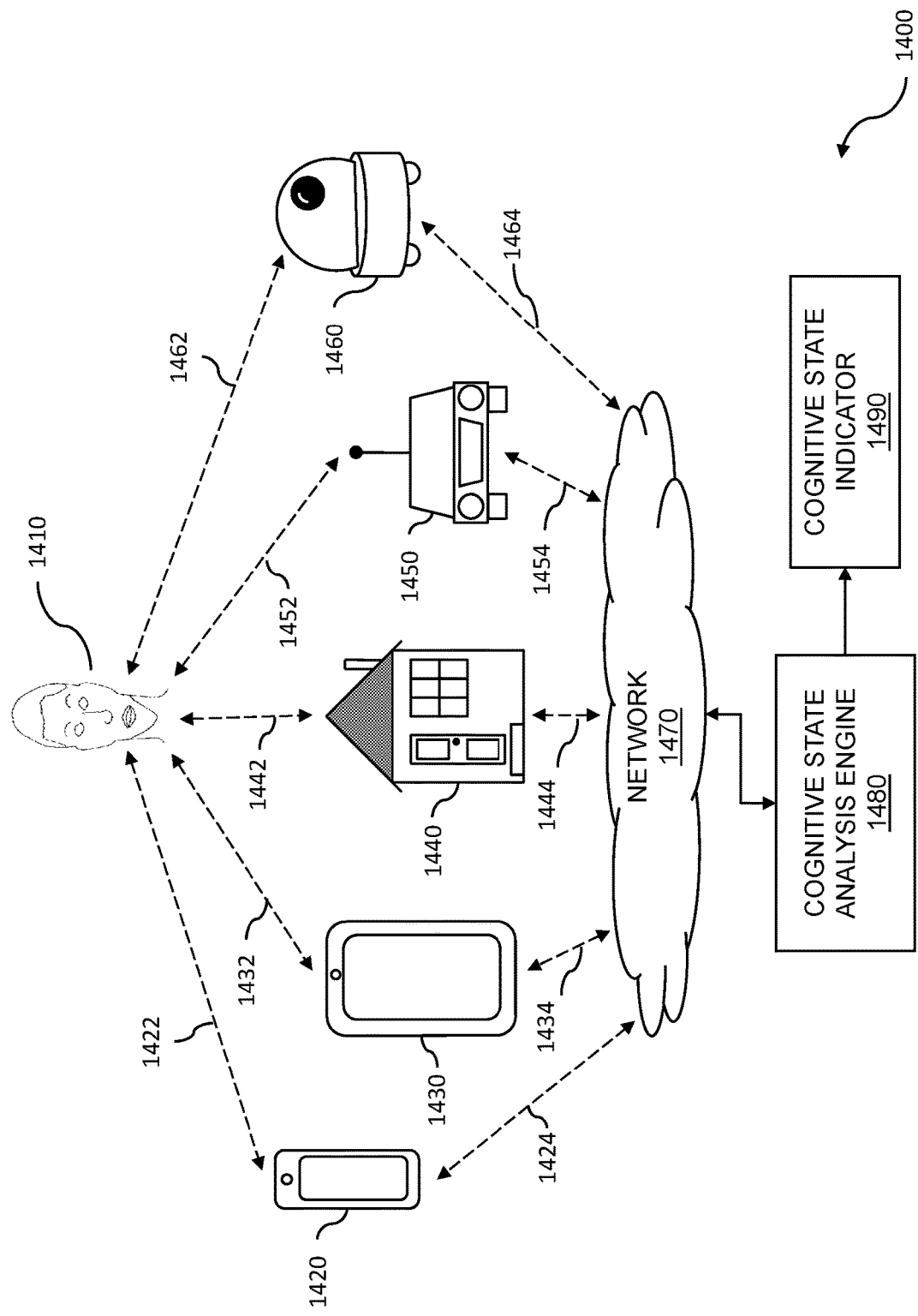
FIG. 14 shows data collection including devices and locations.

FIG. 14 shows data collection including devices and locations 1400. Data, including audio data and video data, can be collected for audio analysis learning using video data. Video data and audio data are obtained. A face within the video data is identified, and a voice is associated with the face. Audio classifiers are learned based on analyzing the face for cognitive content. The audio classifier is used to analyze further audio data. The multiple mobile devices, vehicles, and locations, can be used separately or in combination to collect video data on a user 1410. While one person is shown, the video data can be collected on multiple people. A user 1410 can be observed as she or he is performing a task, experiencing an event, viewing a media presentation, and so on. The user 1410 can be shown one or more media presentations, political presentations, social media, or another form of displayed media. The one or more media presentations can be shown to a plurality of people. The media presentations can be displayed on an electronic display coupled to a client device. The data collected on the user 1410 or on a plurality of users can be in the form of one or more videos, video frames, still images, etc. The plurality of videos can be of people who are experiencing different situations. Some example situations can include the user or plurality of users being exposed to TV programs, movies, video clips, social media, social sharing, and other such media. The situations could also include exposure to media such as advertisements, political messages, or news programs. As noted before, video data can be collected on one or more users in substantially identical or different situations and viewing either a single media presentation or a plurality of presentations. The data collected on the user 1410 can be analyzed and viewed for a variety of purposes including expression analysis, mental state analysis, cognitive state analysis, and so on. The electronic display can be on a smartphone 1420 as shown, a tablet computer 1430, a personal digital assistant, a television, a mobile monitor, or any other type of electronic device. In one embodiment, expression data is collected on a mobile device such as a cell phone 1420, a tablet computer 1430, a laptop computer, or a watch. Thus, the multiple sources can include at least one mobile device, such as a phone 1420 or a tablet 1430, or a wearable device such as a watch or glasses (not shown). A mobile device can include a front-facing camera and/or a rear-facing camera that can be used to collect expression data. Sources of expression data can include a webcam, a phone camera, a tablet camera, a wearable camera, and a mobile camera. A wearable camera can comprise various camera devices, such as a watch camera. In addition to using client devices for data collection from the user 1410, data can be collected in a house 1440 using a web camera; in a vehicle 1450 using a web camera, client device, etc.; by a social robot 1460, and so on.

As the user 1410 is monitored, the user 1410 might move due to the nature of the task, boredom, discomfort, distractions, or for another reason. As the user moves, the camera with a view of the user's face can be changed. Thus, as an example, if the user 1410 is looking in a first direction, the line of sight 1422 from the smartphone 1420 is able to observe the user's face, but if the user is looking in a second direction, the line of sight 1432 from the tablet 1430 is able to observe the user's face. Furthermore, in other embodiments, if the user is looking in a third direction, the line of sight 1442 from a camera in the house 1440 is able to observe the user's face, and if the user is looking in a fourth direction, the line of sight 1452 from the camera in the vehicle 1450 is able to observe the user's face. If the user is looking in a fifth direction, the line of sight 1462 from the social robot 1460 is able to observe the user's face. If the user is looking in a sixth direction, a line of sight from a wearable watch-type device, with a camera included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 1410 can also use a wearable device including a camera for gathering contextual information and/or collecting expression data on other users. Because the user 1410 can move her or his head, the facial data can be collected intermittently when she or he is looking in a direction of a camera. In some cases, multiple people can be included in the view from one or more cameras, and some embodiments include filtering out faces of one or more other people to determine whether the user 1410 is looking toward a camera. All or some of the expression data can be continuously or sporadically available from the various devices and other devices.

The captured video data can include cognitive content, such as facial expressions, etc., and can be transferred over a network 1470. The network can include the Internet or other computer network. The smartphone 1420 can share video using a link 1424, the tablet 1430 using a link 1434, the house 1440 using a link 1444, the vehicle 1450 using a link 1454, and the social robot 1460 using a link 1464. The links 1424, 1434, 1444, 1454, and 1464 can be wired, wireless, and hybrid links. The captured video data, including facial expressions, can be analyzed on a cognitive state analysis engine 1480, on a computing device such as the video capture device, or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capture device. The analysis data from the cognitive state analysis engine can be processed by a cognitive state indicator 1490. The cognitive state indicator 1490 can indicate cognitive states, mental states, moods, emotions, etc.

Figure 15:
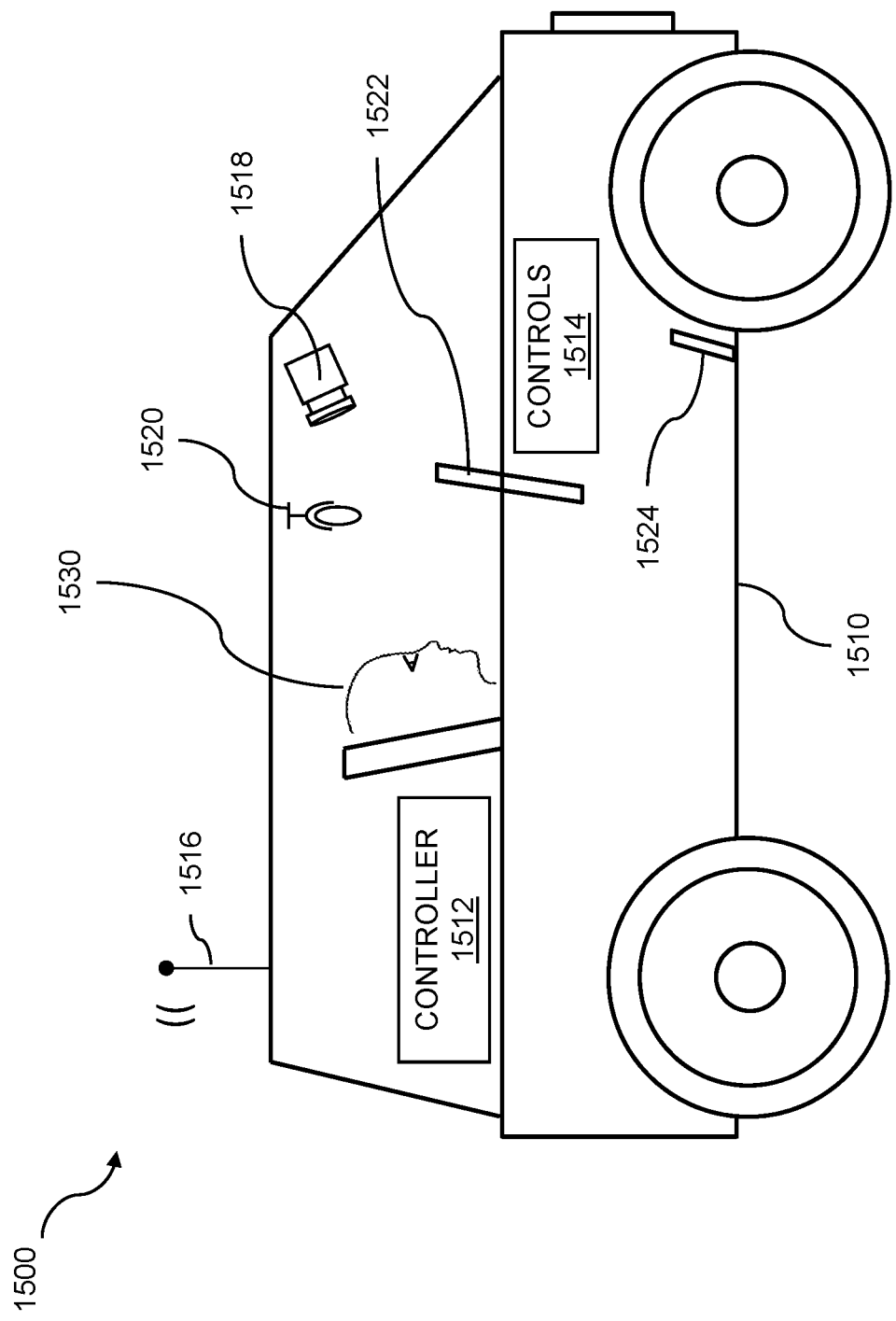
FIG. 15 is a system diagram for a vehicle interior showing controls.

FIG. 15 is a system diagram 1500 for a vehicle interior showing controls. A vehicle can be controlled or monitored by collecting audio data and image data from one or more people within the vehicle. Vehicle control is based on audio analysis learning using video data. The audio analysis can include cognitive analysis. Video data that includes images of one or more people is obtained, and audio data that corresponds to the video data is also obtained. A face is identified with the video data, and a voice is associated with the face. The face is analyzed for cognitive content, and an audio classifier is learned. Further audio is analyzed using the audio classifier. An occupant 1530 of a vehicle 1510 can be observed by using a camera 1518, a microphone 1520, and other image and audio capture techniques. The image data can include video data, facial data, etc. The audio data can include voice data, ambient sound data, speech data, non-speech data, non-speech vocalizations, and so on. The video data and the audio data can include cognitive state data, where the cognitive state data can include facial data. The occupant can be a driver of the vehicle 1510 or a passenger within the vehicle.

The interior of a vehicle 1510 can be a standard vehicle, an autonomous vehicle, a semi-autonomous vehicle, and so on. The vehicle can be an automobile, a van, a sport utility vehicle (SUV), a truck, a bus, a special purpose vehicle, etc. The interior of the vehicle 1510 can include standard controls such as a steering wheel 1522, a throttle control (not shown), a brake 1524, and so on. The interior of the vehicle can include other controls 1514 such as controls for seats, mirrors, climate controls, music, noise cancelling, etc. The controls 1514 of the vehicle 1510 can be controlled by a controller 1512. The controller 1512 can control the vehicle 1510 in various manners such as autonomously, semi-autonomously, with assistance to the vehicle occupant 1530, assertively to a vehicle occupant, etc. In embodiments, the controller provides no vehicle control techniques, assistance, etc. The controller 1512 can receive instructions via a network using an antenna 1516, infrared (IR) receiver, or using other wireless techniques. The controller 1512 can be preprogrammed to cause the vehicle to follow a specific route.

Figure 16:
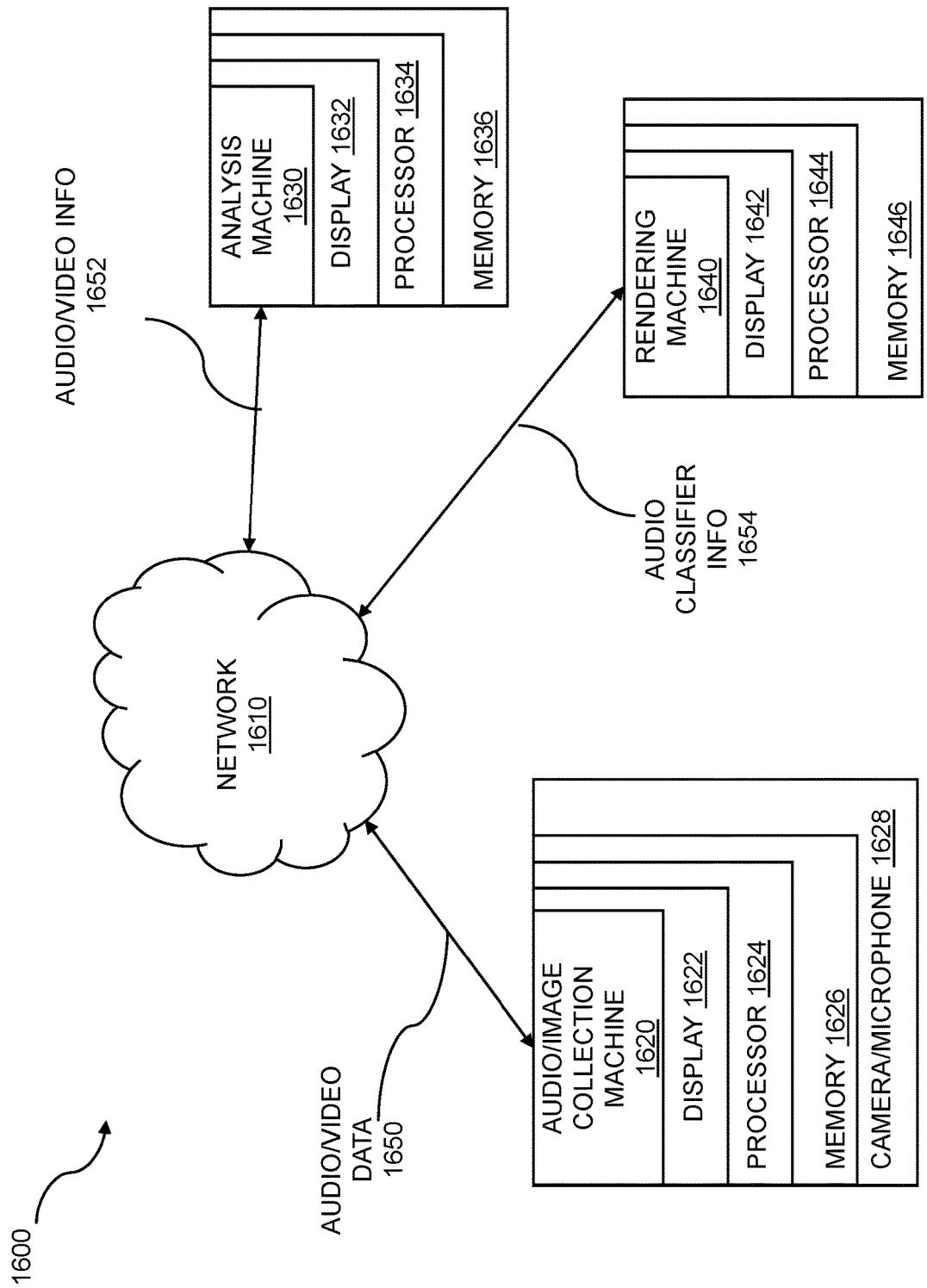
FIG. 16 is a system for audio analysis.

FIG. 16 is a system for audio analysis. An example system 1600 is shown for audio learning based on video analysis. The system 1600 can provide a computer-implemented method for audio analysis comprising: obtaining video data, on a first computing device, wherein the video data includes images of one or more people; obtaining audio data, on a second computing device, corresponding to the video data; identifying a face within the video data; associating a first voice, from the audio data, with the face within the video data; analyzing the face within the video data for cognitive content; learning an audio classifier, on a third computing device, based on the analyzing of the face within the video data; and analyzing further audio data using the audio classifier.

The system 1600 can include one or more audio and image collection machines 1620 linked to an analysis machine 1630 and a rendering machine 1640 via a network 1610 such as the Internet or another computer network. The network can be a wired network, a wireless network, or a hybrid network. Audio and video data 1650 such as facial image data can be transferred to the analysis server 1630 through the network 1610, for example. The example collection machine 1620 shown comprises one or more processors 1624 coupled to a memory 1626 which can store and retrieve instructions, a display 1622, and a camera and microphone 1628. A microphone, audio transducer, or other audio capture technique can be coupled to the camera, to the collection machine 1620, etc., and can be used for capture of audio data. The camera can include a webcam, a video camera, a still camera, a thermal imager, a CCD device, a phone camera, a three-dimensional camera, a depth camera, a light field camera, multiple webcams used to show different views of a person, or any other type of image capture technique that can allow captured data to be used in an electronic system. The memory 1626 can be used for storing instructions, image data on a plurality of people, audio data on a plurality of people, one or more classifiers, voice data, and so on. The display 1622 can be any electronic display, including but not limited to, a computer display, a laptop screen, a netbook screen, a tablet computer screen, a smartphone display, a mobile device display, a remote with a display, a television, a projector, or the like.

The analysis machine 1630 can include one or more processors 1634 coupled to a memory 1636 which can store and retrieve instructions, and it can include a display 1632. The analysis machine 1630 can receive audio and video data information 1652 that includes images of one or more people, and audio from one or more people. The analysis machine 1630 can analyze video data to identify a face, to associate audio data with the face, and to analyze the face for cognitive content, mental content, emotional content, etc. The analysis machine 1630 can use audio and video data 1650 received from the image data collection machine 1620 to learn an audio classifier and to produce audio classifier information 1654. This audio classifier information can be provided to various machines for analysis of further audio data. In some embodiments, the analysis machine 1630 receives audio data and video data from a plurality of audio and image data collection machines, aggregates the audio data and the video data, and processes the audio data, video data, or the aggregated audio data and video data. In some embodiments, the analysis machine 1630 captures cognitive state data from the audio or video data 1650 and infers cognitive states from the cognitive state data.

The rendering machine 1640 can include one or more processors 1644 coupled to a memory 1646 which can store and retrieve instructions and data, and it can include a display 1642. The rendering of cognitive content based on analysis using audio classifier information 1654 can occur on the rendering machine 1640 or on a different platform from the rendering machine 1640. In embodiments, the rendering based on the audio classifier information data occurs on the audio and image data collection machine 1620 or on the analysis machine 1630. As shown in the system 1600, the rendering machine 1640 can receive audio classifier information data 1654 via the network 1610, the Internet, or another network, from the audio and image data collection machine 1620, from the analysis machine 1630, or from a combination of these entities. The rendering machine can include a visual display or any other appropriate display format.

The system 1600 can include a computer program product embodied in a non-transitory computer readable medium for audio analysis, the computer program product comprising code which causes one or more processors to perform operations of: obtaining video data wherein the video data includes images of one or more people; obtaining audio data corresponding to the video data; identifying a face within the video data; associating a first voice, from the audio data, with the face within the video data; analyzing the face within the video data for cognitive content; learning an audio classifier based on the analyzing of the face within the video data; and analyzing further audio data using the audio classifier.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"— may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A computer-implemented method for audio analysis comprising:
   obtaining video data, on a first computing device, wherein the video data includes images of one or more people;
   obtaining audio data, on a second computing device, corresponding to the video data;
   identifying a face within the video data;
   associating a first voice, from the audio data, with the face within the video data;
   analyzing the face within the video data for cognitive content;
   learning an audio classifier, on a third computing device, based on the analyzing of the face within the video data, wherein the learning the audio classifier is based on analyzing a plurality of faces within the video data; and
   analyzing further audio data using the audio classifier.

2. The method of claim 1 further comprising extracting audio features corresponding to the cognitive content of the video data.

3. The method of claim 1 further comprising segmenting the audio data to correspond to an analyzed cognitive state.

4. The method of claim 3 wherein the segmenting the audio data is for a human sensorially detectable unit of time.

5. The method of claim 4 wherein the segmenting the audio data includes noticeable differences in intensity, duration, or pitch.

6. The method of claim 3 wherein the segmenting the audio data is for less than thirty seconds.

7. The method of claim 1 further comprising synchronizing the audio data with the video data.

8. The method of claim 1 further comprising analyzing a first voice for features.

9. The method of claim 8 wherein the analyzing the first voice for features includes evaluation of timbre.

10. The method of claim 8 wherein the analyzing the first voice for features includes evaluation of prosody.

11. The method of claim 8 wherein the analyzing the first voice for features includes analysis of vocal register and vocal resonance, pitch, speech volumes, or speech rate.

12. The method of claim 8 wherein the analyzing the first voice for features includes language analysis.

13. The method of claim 12 wherein the language analysis is dependent on language content.

14. The method of claim 1 wherein the learning is independent of language content.

15. The method of claim 1 wherein the learning further encompasses learning a second audio classifier.

16. The method of claim 1 wherein the cognitive content includes detection of one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, fatigue, drowsiness, or mirth.

17. The method of claim 1 wherein the identifying of the face includes detection of facial expressions.

18. The method of claim 1 further comprising determining a temporal audio signature for use with the further audio data.

19. The method of claim 1 further comprising identifying and separating a second voice from the obtained audio data corresponding to the video data but not associated with the face associated with a first voice, wherein the second voice is included in the learning and wherein the second voice corresponds to a second person.

20. The method of claim 19 further comprising associating the second voice, from the second person, with a second face within the video data.

21. The method of claim 1 further comprising manipulating a vehicle based on the analyzing of the further audio data.

22. The method of claim 21 wherein the manipulating the vehicle includes transferring into autonomous mode; transferring out of autonomous mode; locking out operation; recommending a break for an occupant; recommending a different route; recommending how far to drive; responding to traffic; adjusting seats, mirrors, climate control, lighting, music, audio stimuli, or interior temperature; activating brakes; and assuming steering control.

23. The method of claim 1 wherein the cognitive content includes emotional content or mental state content.

24. The method of claim 1 wherein the first computing device and the second computing device, or the second computing device and the third computing device, are a common device.

25. The method of claim 1 wherein the learning further comprises:
synchronizing the audio data and the video data;
extracting an audio feature associated with the cognitive content that was analyzed from the face; and
abstracting an audio classifier based on the extracted audio feature.

26. A computer program product embodied in a non-transitory computer readable medium for audio analysis, the computer program product comprising code which causes one or more processors to perform operations of:
obtaining video data wherein the video data includes images of one or more people;
obtaining audio data corresponding to the video data;
identifying a face within the video data;
associating a first voice, from the audio data, with the face within the video data;
analyzing the face within the video data for cognitive content;
learning an audio classifier, on a third computing device, based on the analyzing of the face within the video data, wherein the learning the audio classifier is based on analyzing a plurality of faces within the video data; and
analyzing further audio data using the audio classifier.

27. A computer system for audio analysis comprising:
a memory which stores instructions;
one or more processors attached to the memory wherein the one or more processors, when executing the instructions which are stored, are configured to:
obtain video data, on a first computing device, wherein the video data includes images of one or more people;
obtain audio data, on a second computing device, corresponding to the video data;
identify a face within the video data;
associate a first voice, from the audio data, with the face within the video data;
analyze the face within the video data for cognitive content;
learn an audio classifier, on a third computing device, based on the analyzing of the face within the video data, wherein the learning the audio classifier is based on analyzing a plurality of faces within the video data; and
analyze further audio data using the audio classifier.

* * * * *